United States Patent
Peng et al.

(10) Patent No.: US 10,675,940 B2
(45) Date of Patent: Jun. 9, 2020

(54) HEAT PUMP AIR-CONDITIONING SYSTEM AND ELECTRIC VEHICLE

(71) Applicant: BYD COMPANY LIMITED, Shenzhen, Guangdong (CN)

(72) Inventors: Shaoheng Peng, Shenzhen (CN); Meijiao Ye, Shenzhen (CN); Xuefeng Chen, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 34 days.

(21) Appl. No.: 16/099,539

(22) PCT Filed: May 3, 2017

(86) PCT No.: PCT/CN2017/082949
§ 371 (c)(1),
(2) Date: Nov. 7, 2018

(87) PCT Pub. No.: WO2017/193858
PCT Pub. Date: Nov. 16, 2017

(65) Prior Publication Data
US 2019/0202258 A1    Jul. 4, 2019

(30) Foreign Application Priority Data

May 10, 2016   (CN) .......................... 2016 1 0307087

(51) Int. Cl.
*B60H 1/00*    (2006.01)
*B60H 1/32*    (2006.01)
(Continued)

(52) U.S. Cl.
CPC .......... *B60H 1/00385* (2013.01); *B60H 1/00* (2013.01); *B60H 1/00885* (2013.01);
(Continued)

(58) Field of Classification Search
CPC .............. B60H 1/00385; B60H 1/3228; B60H 1/32281; B60H 1/00; B60H 1/00885;
(Continued)

(56) References Cited

U.S. PATENT DOCUMENTS 3,666,004 A * 5/1972 Hilgemann ............... E04H 4/12
  165/240
4,122,688 A * 10/1978 Mochizuki ................ F25B 5/02
  62/196.1
(Continued)

FOREIGN PATENT DOCUMENTS

CN    104284789 A    1/2015
CN    105121977 A    12/2015
(Continued)

OTHER PUBLICATIONS

International Report on Patentability for International Application No. PCT/CN2017/082949 dated Nov. 13, 2018.
(Continued)

*Primary Examiner* — Claire E Rojohn, III
(74) *Attorney, Agent, or Firm* — Calfee, Halter & Griswold, LLP

(57) ABSTRACT

This disclosure discloses a heat pump air-conditioning system and an electric vehicle. The system includes a HVAC assembly, a compressor, and an outdoor heat exchanger. The HVAC assembly includes an indoor condenser, an indoor evaporator, and a damper mechanism. The damper mechanism selectively opens ventilation channels of the indoor condenser and/or the indoor evaporator. An outlet of the compressor communicates to an inlet of the indoor condenser. An outlet of the indoor condenser communicates to an inlet of the outdoor heat exchanger selectively through a first throttle branch or a first through-flow branch. An outlet of the outdoor heat exchanger communicates to an inlet of the indoor evaporator selectively through a second throttle
(Continued)

branch or a second through-flow branch. Both an outlet of the indoor evaporator, the outlet of the indoor condenser, and the outlet of the outdoor heat exchanger communicate to an inlet of the compressor.

17 Claims, 22 Drawing Sheets

(51) Int. Cl.
  *F25B 5/04* (2006.01)
  *F25B 6/04* (2006.01)
  *F25B 49/02* (2006.01)

(52) U.S. Cl.
  CPC ....... *B60H 1/00921* (2013.01); *B60H 1/3213* (2013.01); *B60H 1/3223* (2013.01); *B60H 1/3228* (2019.05); *B60H 1/32281* (2019.05); *F25B 5/04* (2013.01); *F25B 6/04* (2013.01); *F25B 49/02* (2013.01); *F25B 2400/0403* (2013.01); *F25B 2400/0409* (2013.01); *F25B 2400/0411* (2013.01); *F25B 2600/2501* (2013.01)

(58) Field of Classification Search
  CPC .. B60H 1/00921; B60H 1/321; B60H 1/3223; F25B 5/04; F25B 6/04; F25B 49/02; F25B 2400/0403; F25B 2400/0409; F25B 2400/0411; F25B 2600/2501
  USPC ........................................................ 165/202
  See application file for complete search history.

(56) References Cited

U.S. PATENT DOCUMENTS

| | | | | |
|---|---|---|---|---|
| 4,224,804 A * | 9/1980 | Haas | ................... | B63C 11/28 114/315 |
| 4,437,316 A * | 3/1984 | Dyer | ................... | B01D 1/2884 62/238.4 |
| 4,742,689 A * | 5/1988 | Lowes | ................... | F25B 41/04 62/196.4 |
| 4,974,418 A * | 12/1990 | Levine | ................... | F25B 47/025 62/155 |
| 4,979,374 A * | 12/1990 | Kabakov | ................... | F25B 30/06 62/238.2 |
| 5,237,833 A * | 8/1993 | Hayashida | ................... | F24F 3/065 62/228.1 |
| 5,553,457 A * | 9/1996 | Reznikov | ................... | F25B 5/04 62/198 |
| 6,212,900 B1 * | 4/2001 | Iritani | ................... | B60H 1/00021 62/428 |
| 6,314,750 B1 * | 11/2001 | Ishikawa | ................... | B60H 1/00921 62/324.1 |
| 7,003,975 B2 * | 2/2006 | Feuerecker | ................... | B60H 1/00914 62/324.5 |
| 7,121,103 B2 * | 10/2006 | Itoh | ................... | B60H 1/00735 62/173 |
| 7,191,608 B2 * | 3/2007 | Yamasaki | ................... | F25B 9/008 62/229 |
| 8,948,966 B2 * | 2/2015 | Kim | ................... | F25B 29/003 454/75 |
| 9,062,903 B2 * | 6/2015 | Sjoholm | ................... | F25B 41/04 |
| 9,211,778 B2 * | 12/2015 | Takahashi | ................... | B60H 1/00907 |
| 9,328,945 B2 * | 5/2016 | Arai | ................... | B60H 1/00278 |
| 9,358,856 B2 * | 6/2016 | Ragazzi | ................... | B60H 1/00485 |
| 9,440,514 B2 * | 9/2016 | Kondo | ................... | B60H 1/2225 |
| 10,093,146 B2 * | 10/2018 | Furll | ................... | B60H 1/00921 |
| 10,525,792 B2 * | 1/2020 | Suzuki | ................... | B60H 1/3229 |
| 2001/0003311 A1 * | 6/2001 | Karl | ................... | B60H 1/00921 165/202 |
| 2002/0017106 A1 * | 2/2002 | Flynn | ................... | F25B 47/022 62/156 |
| 2002/0023448 A1 * | 2/2002 | Ito | ................... | B60H 1/3227 62/222 |
| 2004/0020221 A1 * | 2/2004 | Flynn | ................... | C09K 5/045 62/156 |
| 2006/0053811 A1 * | 3/2006 | Lifson | ................... | F25B 5/02 62/196.3 |
| 2006/0169790 A1 * | 8/2006 | Caesar | ................... | B60H 1/00785 237/12 |
| 2006/0266072 A1 * | 11/2006 | Takeuchi | ................... | F25B 40/00 62/500 |
| 2007/0000262 A1 * | 1/2007 | Ikegami | ................... | F25B 31/002 62/170 |
| 2007/0119207 A1 * | 5/2007 | Oshitani | ................... | F25B 47/02 62/500 |
| 2007/0169512 A1 * | 7/2007 | Ishizaka | ................... | F25B 5/04 62/515 |
| 2008/0078191 A1 * | 4/2008 | Morishita | ................... | F04C 18/3564 62/126 |
| 2008/0087040 A1 * | 4/2008 | Oshitani | ................... | F25B 41/00 62/500 |
| 2009/0229304 A1 * | 9/2009 | Ogata | ................... | F25B 5/04 62/500 |
| 2009/0241573 A1 * | 10/2009 | Ikegami | ................... | B60H 1/00335 62/238.7 |
| 2011/0005255 A1 * | 1/2011 | Tanihata | ................... | B60H 1/00785 62/238.7 |
| 2011/0023512 A1 * | 2/2011 | Kawagoe | ................... | F25B 13/00 62/196.1 |
| 2013/0213083 A1 * | 8/2013 | Higashiiue | ................... | F25B 5/04 62/500 |
| 2013/0227984 A1 * | 9/2013 | Tsunoda | ................... | B60H 3/024 62/324.1 |
| 2014/0290296 A1 * | 10/2014 | Katoh | ................... | F28D 1/0452 62/238.7 |
| 2016/0068047 A1 * | 3/2016 | Kobayashi | ................... | F25B 5/04 62/401 |
| 2016/0146478 A1 * | 5/2016 | Mantegazza | ................... | F25B 41/043 62/160 |
| 2017/0010027 A1 * | 1/2017 | Liu | ................... | F25B 41/04 |
| 2017/0211850 A1 * | 7/2017 | Fukushima | ................... | F25B 43/00 |
| 2017/0253105 A1 * | 9/2017 | Allgaeuer | ................... | B60H 1/32284 |
| 2018/0093548 A1 * | 4/2018 | Ceperkovic | ................... | B60H 1/00849 |
| 2018/0231277 A1 * | 8/2018 | Liengaard | ................... | F25B 5/02 |
| 2018/0252443 A1 * | 9/2018 | Naito | ................... | F25B 41/062 |
| 2019/0032985 A1 * | 1/2019 | Babucke | ................... | F25B 49/02 |
| 2019/0032986 A1 * | 1/2019 | Babucke | ................... | F25D 11/022 |

FOREIGN PATENT DOCUMENTS

CN      105128622 A     12/2015
KR    20120093668 A      8/2012

OTHER PUBLICATIONS

Search Report and Written Opinion for International Application No. PCT/CN2017/082949 dated Jul. 20, 2017.

* cited by examiner

HEAT PUMP AIR-CONDITIONING SYSTEM AND ELECTRIC VEHICLE

CROSS-REFERENCE TO RELATED APPLICATION

The present application is a 371 Application of International Application No. PCT/CN2017/082949, filed on May 3, 2017, which claims priority of Chinese Patent Application No. 201610307087.6 filed in China on May 10, 2016, the entire contents of which are hereby incorporated by reference.

BACKGROUND

Technical Field

This disclosure relates to the field of air conditioners of electric vehicles, and specifically to a heat pump air-conditioning system and an electric vehicle.

Related Art

Unlike a conventional vehicle, an electric vehicle does not have excess engine heat for heating, and cannot provide a heat source for heating. Therefore, an air-conditioning system of the electric vehicle needs to have a heat supplying function, that is, supplying heat by using a heat pump air-conditioning system and/or an electric heater.

An invention patent application having the publication No. CN105128622A discloses an electric-vehicle heat pump air-conditioning system. In most urban road conditions, a time period during which external circulation of a vehicle is enabled is short, and a proportion of a load caused by enabling the external circulation to a load of the entire vehicle is not too high. For a vehicle, a main thermal load is transferring heat using glass and personnel. Therefore, an effect of purely pre-cooling or pre-heating a ventilation system to improve comfort is not obvious. In addition, in a high-temperature working condition (an ambient temperature is approximately 50° C. or above) or a low-temperature working condition (an ambient temperature is lower than −10° C.), pre-cooling or pre-heating the ventilation system is far inadequate, and it is very difficult to produce a good refrigerating or heating effect in a harsh environment.

SUMMARY

An objective of this disclosure is to provide a heat pump air-conditioning system and an electric vehicle, to resolve a problem that refrigerating and heating effects of a vehicle heat pump air-conditioning system of a pure electric vehicle without an excess engine heat circulation system or a hybrid electric vehicle in electric-only mode in a harsh environment are both unfavourable.

To achieve the foregoing objective, according to a first aspect of this disclosure, an electric-vehicle heat pump air-conditioning system is provided. The heat pump air-conditioning system includes a Heating Ventilation and Air Conditioning (HVAC) assembly, a compressor, and an outdoor heat exchanger, where the HVAC assembly includes an indoor condenser, an indoor evaporator, and an damper mechanism, the damper mechanism is used for selectively opening a ventilation channel to the indoor condenser and/or a ventilation channel to the indoor evaporator, an outlet of the compressor is in communication with an inlet of the indoor condenser, an outlet of the indoor condenser is in communication with an inlet of the outdoor heat exchanger selectively through a first throttle branch or a first through-flow branch, an outlet of the outdoor heat exchanger is in communication with an inlet of the indoor evaporator selectively through a second throttle branch or a second through-flow branch, an outlet of the indoor evaporator is in communication with an inlet of the compressor, the outlet of the indoor condenser is in communication with the inlet of the compressor through a third throttle branch that is selectively open or closed, and the outlet of the outdoor heat exchanger is in communication with the inlet of the compressor through a fourth throttle branch that is selectively open or closed.

According to an embodiment of this disclosure, a first switch valve and a first throttle element are connected in series to the third throttle branch, and a second switch valve and a second throttle element are connected in series to the fourth throttle branch.

According to an embodiment of this disclosure, the first throttle element is a capillary tube or an expansion valve, and the second throttle element is a capillary tube or an expansion valve.

According to an embodiment of this disclosure, the first through-flow branch is provided with a third switch valve, and the first throttle branch is provided with a first expansion valve.

According to an embodiment of this disclosure, the heat pump air-conditioning system further includes a first expansion switch valve, an inlet of the first expansion switch valve is in communication with the outlet of the indoor condenser, an outlet of the first expansion switch valve is in communication with the inlet of the outdoor heat exchanger, the first throttle branch is a throttle passage of the first expansion switch valve, and the first through-flow branch is a through-flow passage of the first expansion switch valve.

According to an embodiment of this disclosure, the second through-flow branch is provided with a fourth switch valve, and the second throttle branch is provided with a second expansion valve.

According to an embodiment of this disclosure, the heat pump air-conditioning system is applied to an electric vehicle, and the heat pump air-conditioning system further includes a plate heat exchanger, where the plate heat exchanger is disposed inside the second through-flow branch, and the plate heat exchanger is also disposed inside a motor cooling system of the electric vehicle.

According to an embodiment of this disclosure, a refrigerant inlet of the plate heat exchanger is in communication with the outlet of the outdoor heat exchanger, and a refrigerant outlet of the plate heat exchanger is in communication with an inlet of the fourth switch valve.

According to an embodiment of this disclosure, the motor cooling system includes a motor, a motor heat dissipator, and a water pump that are connected in series to the plate heat exchanger to form a loop.

According to an embodiment of this disclosure, the heat pump air-conditioning system further includes a second expansion switch valve, an inlet of the second expansion switch valve is in communication with the outlet of the outdoor heat exchanger, an outlet of the second expansion switch valve is in communication with the inlet of the indoor evaporator, the second throttle branch is a throttle passage of the second expansion switch valve, and the second through-flow branch is a through-flow passage of the second expansion switch valve.

According to an embodiment of this disclosure, the heat pump air-conditioning system is applied to an electric vehicle, and the heat pump air-conditioning system further includes a plate heat exchanger, where a refrigerant inlet of the plate heat exchanger is in communication with the outlet of the second expansion switch valve, a refrigerant outlet of the plate heat exchanger is in communication with the inlet of the indoor evaporator, and the plate heat exchanger is also disposed inside a motor cooling system of the electric vehicle.

According to an embodiment of this disclosure, the motor cooling system includes a coolant trunk, a first coolant branch, and a second coolant branch, a first end of the coolant trunk is selectively in communication with a first end of the first coolant branch or a first end of the second coolant branch, and a second end of the first coolant branch and a second end of the second coolant branch are in communication with a second end of the coolant trunk, where a motor, a motor heat dissipator, and a water pump are connected in series to the coolant trunk, and the plate heat exchanger is connected in series to the first coolant branch.

According to an embodiment of this disclosure, the heat pump air-conditioning system further includes a gas-liquid separator, the outlet of the indoor evaporator is in communication with an inlet of the gas-liquid separator, and an outlet of the gas-liquid separator is in communication with the inlet of the compressor.

According to an embodiment of this disclosure, the HVAC assembly further includes a PTC heater, and the PTC heater is used for heating air flowing through the indoor condenser.

According to an embodiment of this disclosure, the PTC heater is disposed on a windward side or a leeward side of the indoor condenser.

According to a second aspect of this disclosure, an electric vehicle is provided. The electric vehicle includes the foregoing heat pump air-conditioning system.

The heat pump air-conditioning system provided in this disclosure can control processes, such as refrigerating and heating, of a vehicle air-conditioning system without changing a refrigerant circulation direction. In addition, a plurality of throttle branches is added to the system to enable the system to have a good refrigerating effect at a high temperature and a good heating effect at a low temperature while having a good defrosting effect. In this disclosure, an air flowing direction in the indoor evaporator and the indoor condenser in the HVAC assembly may be independently controlled and adjusted by using the damper mechanism, that is, during refrigerating, air flows through only the indoor evaporator, no air passes through the indoor condenser, and the indoor condenser is merely used as a refrigerant passage; and during heating, air flows through only the indoor condenser, no air passes through the indoor evaporator, and the indoor evaporator is merely used as a refrigerant passage. In addition, because the heat pump air-conditioning system of this disclosure employs only one outdoor heat exchanger, air resistance against a front end module of a vehicle can be reduced, problems, such as low heating energy efficiency, impossibility in satisfying regulatory requirements for defrosting and defogging, and complex installation, of a vehicle heat pump air-conditioning system of a pure electric vehicle without an excess engine heat circulation system or a hybrid electric vehicle in electric-only mode are resolved, and effects of reducing energy consumption, simplifying a system structure, and facilitating pipeline arrangement are achieved. The heat pump air-conditioning system provided in this disclosure features a simple structure, and therefore, can be easily mass produced.

Other features and advantages of this disclosure are described in detail in the Detailed Description part below.

BRIEF DESCRIPTION OF THE DRAWINGS

Accompanying drawings are used to provide further understanding on this disclosure, constitute a part of this specification, and are used, together with the following specific implementations, to explain this disclosure, but do not constitute limitations to this disclosure, wherein.

DETAILED DESCRIPTION

Specific implementations of this disclosure are described in detail below with reference to the accompanying drawings. It should be understood that the specific implementations described herein are merely used to describe and explain this disclosure rather than limit this disclosure.

In this disclosure, unless contrarily described, the used locality terms, such as "up, down, left, and right", are usually relative to graphical directions of the accompanying drawings. "Upstream and downstream" are relative to a flowing direction of a medium such as a refrigerant. Specifically, being in a direction the same as a flowing direction of the refrigerant is being downstream, and being in a direction opposite to the flowing direction of the refrigerant is being upstream. "Inside and outside" indicate being inside and outside a contour of a corresponding component.

In addition, in this disclosure, an electric vehicle may be a pure electric vehicle, a hybrid electric vehicle, and a fuel cell vehicle.

Figure 1:
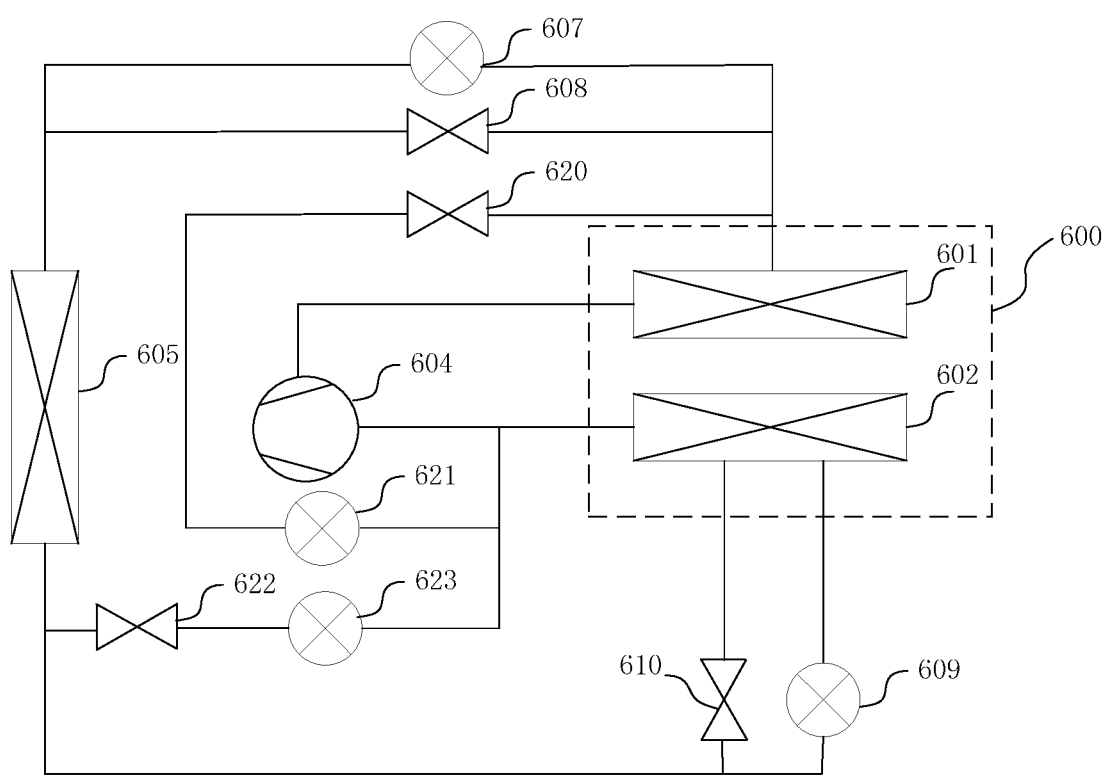
FIG. 1 is a schematic structural diagram of a heat pump air-conditioning system according to an implementation of this disclosure.

FIG. 1 is a schematic structural diagram of a heat pump air-conditioning system according to an implementation of this disclosure. As shown in FIG. 1A, the system may include: an HVAC assembly 600, a compressor 604, and an outdoor heat exchanger 605. The HVAC assembly 600 may include an indoor condenser 601, an indoor evaporator 602, and a damper mechanism (not shown), and the damper mechanism may be used for selectively opening a ventilation channel to the indoor condenser 601 and/or a ventilation channel to the indoor evaporator 602.

In this disclosure, in the HVAC assembly, opening and closure of the ventilation channel to the indoor condenser 601 and the ventilation channel to the indoor evaporator 602 may be independently controlled by using the damper mechanism. That is, air may be controlled to flow through only the indoor condenser 601, or only the indoor evaporator 602, or both the indoor condenser 601 and the indoor evaporator 602 by using the damper mechanism. Therefore, independent control on an air direction can be implemented.

In addition, as shown in FIG. 1A, an outlet of the compressor 604 is in communication with an inlet of the indoor condenser 601, an outlet of the indoor condenser 601 is in communication with an inlet of the outdoor heat exchanger 605 selectively through a first throttle branch or a first through-flow branch, an outlet of the outdoor heat exchanger 605 is in communication with an inlet of the indoor evaporator 602 selectively through a second throttle branch or a second through-flow branch, and an outlet of the indoor evaporator 602 is in communication with an inlet of the compressor 604. The outlet of the indoor condenser 601 is further in communication with the inlet of the compressor 604 through a third throttle branch that is selectively open or closed, where the third throttle branch is open during low-temperature heating, so that a vehicle has a good heating effect at a low temperature; an outlet of the outdoor heat exchanger 605 is further in communication with the inlet of the compressor 604 through a fourth throttle branch that is selectively open or closed, the fourth throttle branch is open during high-temperature refrigerating, so that a vehicle has a good refrigerating effect at a high temperature.

Specifically, as shown in FIG. 1, the third throttle branch may be connected in series to a first switch valve 620 and a first throttle element 621, and preferably, the first switch valve 620 is disposed upstream of the first throttle element 621, to enable the system to respond quickly; and the fourth throttle branch may be connected in series to a second switch valve 622 and a second throttle element 623, and preferably, the second switch valve 622 is disposed upstream of the second throttle element 623, to enable the system to respond quickly. The first switch valve 620 and the second switch valve 622 are used for controlling opening or closure of corresponding branches, and the first throttle element 621 and the second throttle element 623 are used for controlling throttle functions of corresponding branches.

Further, the first throttle element 621 may be a capillary tube or an expansion valve, and the second throttle element 623 may be a capillary tube or an expansion valve. Forms of the first throttle element 621 and the second throttle element 623 are not specifically limited herein, provided that a throttle function can be implemented, that is, a temperature reduction and/or pressure reduction function is implemented. For example, in FIG. 4a, the first throttle element 621 and the second throttle element 623 may separately be expansion valves, and in FIG. 4b, the first throttle element 621 and the second throttle element 623 may separately be capillary tubes.

In this disclosure, the outlet of the indoor condenser 601 is in communication with the inlet of the outdoor heat exchanger 605 through either the first throttle branch or the first through-flow branch. Such a communication manner can be implemented in various manners. In another implementation, as shown in FIG. 1, the heat pump air-conditioning system may include a third switch valve 608 and a first expansion valve 607, where the third switch valve 608 is disposed on the first through-flow branch, and the first expansion valve 607 is disposed on the first throttle branch. Specifically, as shown in FIG. 1, the outlet of the indoor condenser 601 is in communication with the inlet of the outdoor heat exchanger 605 through the third switch valve 608 to form the first through-flow branch, and the outlet of the indoor condenser 601 is in communication with the inlet of the outdoor heat exchanger 605 through the first expansion valve 607 to form the first throttle branch. When the system is in refrigerating mode, the third switch valve 608 is open, the first expansion valve 607 is closed, and the outlet of the indoor condenser 601 is in communication with the inlet of the outdoor heat exchanger 605 through the first through-flow branch. When the system is in heating mode, the first expansion valve 607 is open, the third switch valve 608 is closed, and the outlet of the indoor condenser 601 is in communication with the inlet of the outdoor heat exchanger 605 through the first throttle branch.

Figure 2:
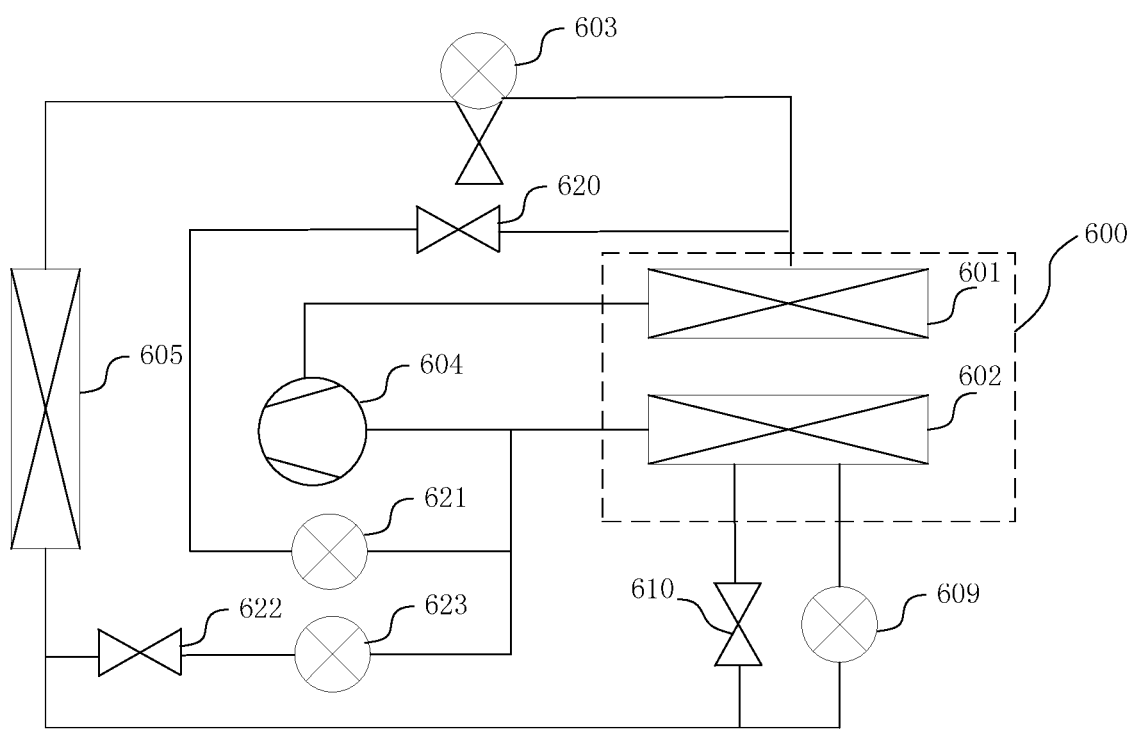
FIG. 2 is a schematic structural diagram of a heat pump air-conditioning system according to another implementation of this disclosure.

In another alternative implementation, as shown in FIG. 2, the heat pump air-conditioning system may further include a first expansion switch valve 603, an inlet of the first expansion switch valve 603 is in communication with the outlet of the indoor condenser 601, and an outlet of the first expansion switch valve 603 is in communication with the inlet of the outdoor heat exchanger 605, where the first throttle branch is a throttle passage of the first expansion switch valve 603, and the first through-flow branch is a through-flow passage of the first expansion switch valve 603.

In this disclosure, the expansion switch valve is a valve having both an expansion valve function (also referred to as an electronic expansion valve function) and a switch valve function (also referred to as an electromagnetic valve function), and may be considered as a combination of a switch valve and an expansion valve. A through-flow passage and a throttle passage are formed inside the expansion switch valve, and when the expansion switch valve is used as a switch valve, the through-flow passage inside it is open, and in this case, a through-flow branch is formed; and when the expansion switch valve is used as an expansion valve, a throttle passage inside it is open, and in this case, a throttle branch is formed.

Similar to the implementations of the first through-flow branch and the first throttle branch, in one of the implementations of the second through-flow branch and the second throttle branch, as shown in FIG. 1, the heat pump air-conditioning system may further include a fourth switch valve 610 and a second expansion valve 609, where the second through-flow branch is provided with a fourth switch valve 610, and the second throttle branch is provided with the second expansion valve 609. Specifically, as shown in FIG. 1, the outlet of the outdoor heat exchanger 605 is in communication with the inlet of the indoor evaporator 602 through the fourth switch valve 610 to form the second through-flow branch, and the outlet of the outdoor heat exchanger 605 is in communication with the inlet of the indoor evaporator 602 through the second expansion valve 609 to form the second throttle branch. When the system is in refrigerating mode, the second expansion valve 609 is open, the fourth switch valve 610 is closed, and the outlet of the outdoor heat exchanger 605 is in communication with the inlet of the indoor evaporator 602 through the second throttle branch. When the system is in heating mode, the fourth switch valve 610 is open, the second expansion valve 609 is closed, and the outlet of the outdoor heat exchanger 605 is in communication with the inlet of the indoor evaporator 602 through the second throttle branch.

Figure 3:
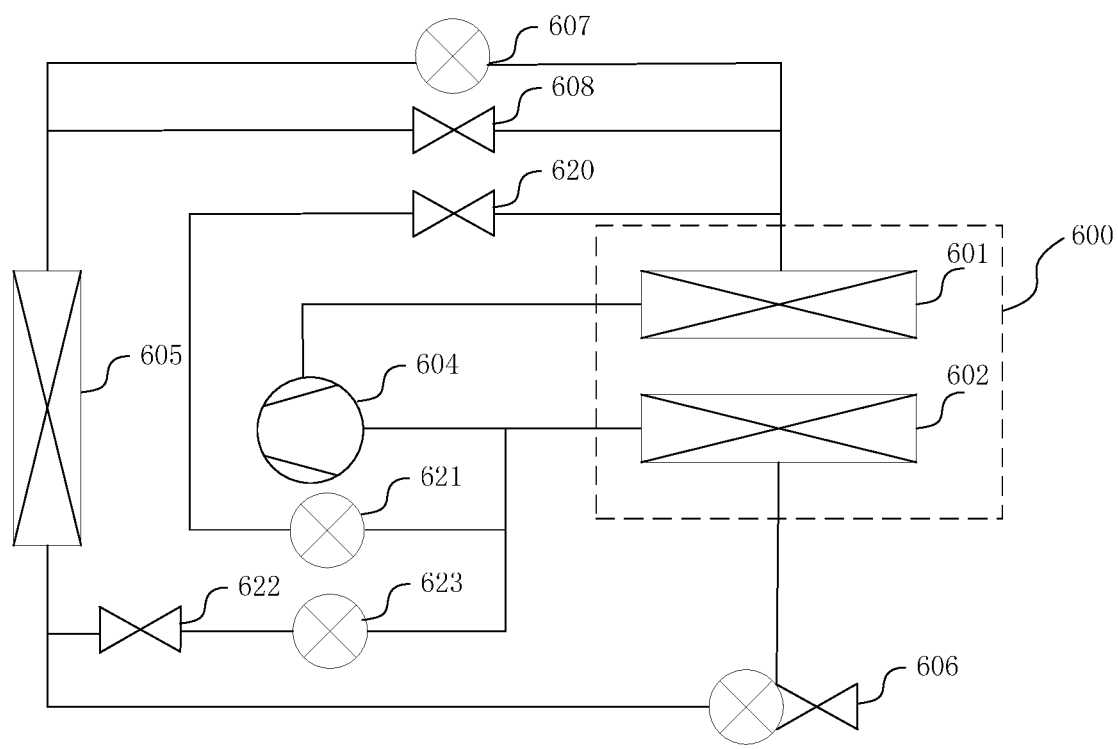
FIG. 3 is a schematic structural diagram of a heat pump air-conditioning system according to another implementation of this disclosure.

In another alternative implementation, as shown in FIG. 3, the heat pump air-conditioning system may further include a second expansion switch valve 606, an inlet of the second expansion switch valve 606 is in communication with the outlet of the outdoor heat exchanger 605, and an outlet of the second expansion switch valve 606 is in communication with the inlet of the indoor evaporator 602, where the second throttle branch is a throttle passage of the second expansion switch valve 606, and the second through-flow branch is a through-flow passage of the second expansion switch valve 606.

Figure 4A:
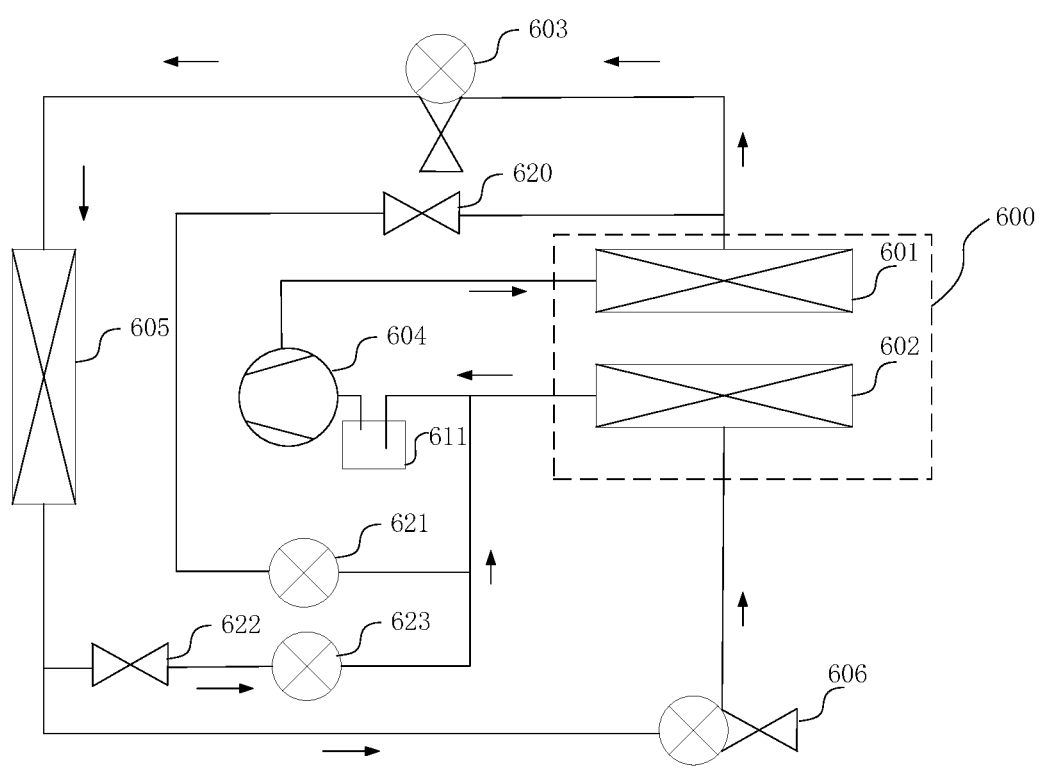
FIG. 4a is a schematic structural diagram of a heat pump air-conditioning system according to another implementation of this disclosure.

To facilitate pipeline arrangement and save an occupied space, preferably, the first expansion switch valve 603 and the second expansion switch valve 606, that is, an implementation shown in FIG. 4a, are used in the heat pump air-conditioning system provided in this disclosure.

FIG. 4a is a schematic structural diagram of a heat pump air-conditioning system according to another implementation of this disclosure. As shown in FIG. 4a, the heat pump air-conditioning system may further include a gas-liquid separator 611, where the outlet of the indoor evaporator 602 is in communication with an inlet of the gas-liquid separator 611, and an outlet of the gas-liquid separator 611 is in communication with the inlet of the compressor 604. In this way, a refrigerant flowing out through the indoor evaporator 602 can first pass through the gas-liquid separator 611 to be subject to gas-liquid separation, and the separated gas flows back to the compressor 604, to prevent the liquid refrigerant from entering the compressor 604 and damaging the compressor 604, so that a service life of the compressor 604 can be prolonged, and efficiency of the entire heat pump air-conditioning system can be improved.

FIG. 4a to FIG. 7 are used as examples below to specifically describe circulation processes and principles of the heat pump air-conditioning system provided in this disclosure in different working modes. It should be understood that circulation processes and principles of the system in other implementations (for example, the implementations shown in FIG. 1 to FIG. 3) are similar to those in FIG. 4a to FIG. 7, and details are not described herein again.

Mode 1: High-Temperature Refrigerating Mode.

Figure 4B:
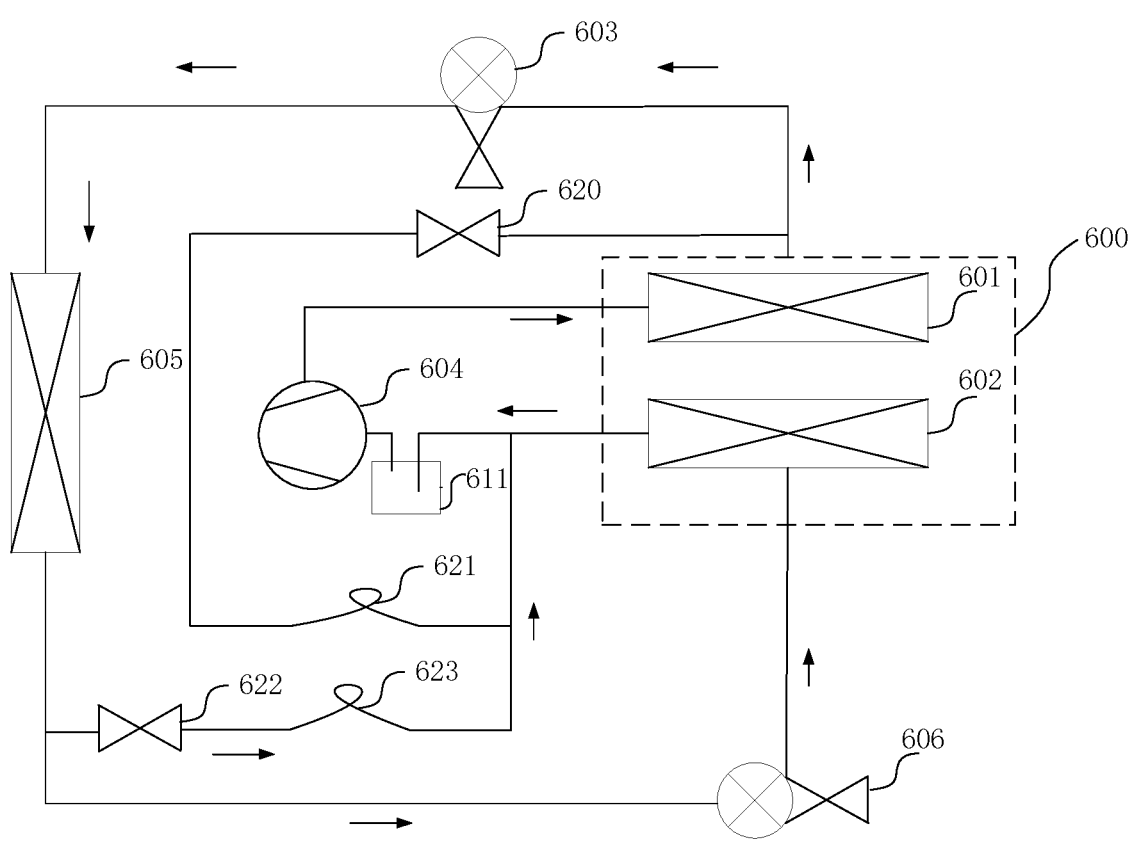
FIG. 4b is a schematic structural diagram of a heat pump air-conditioning system according to another implementation of this disclosure.

When the system is in this mode, the entire system forms a high-temperature refrigerating circulation system. As shown in FIG. 4a and FIG. 4b, first, the compressor 604 discharges a high-temperature high-pressure gas by means of compression, and the compressor 604 is connected to the indoor condenser 601. In this case, the damper mechanism controls air to not pass through the indoor condenser 601. Because no air passes through the indoor condenser 601, heat exchange is not performed inside the indoor condenser 601, and the indoor condenser 601 is merely used as a passage. In this case, the high-temperature high-pressure gas remains unchanged at the outlet of the indoor condenser 601. The outlet of the indoor condenser 601 is in communication with the inlet of the first expansion switch valve 603. In this case, the first expansion switch valve 603 implements a switch valve function, and is merely used as a passage. In this case, the high-temperature high-pressure gas remains unchanged at the outlet of the first expansion switch valve 603. The outlet of the first expansion switch valve 603 is in communication with the inlet of the outdoor heat exchanger 605, the outdoor heat exchanger 605 exchanges heat with outdoor air, and dissipates heat into air, and a moderate-temperature high-pressure liquid is generated at the outlet of the outdoor heat exchanger 605. The outlet of the outdoor heat exchanger 605 is in communication with the inlet of the second expansion switch valve 606. In this case, the second expansion switch valve 606 implements an expansion valve function, and implements a throttle function as a throttle element, and a low-temperature low-pressure liquid is generated at the outlet thereof. An opening degree of the second expansion switch valve 606 may be set according to actual requirements, and the opening degree may be adjusted by calculating a superheat degree of the refrigerant at the outlet of the evaporator according to pressure and temperature data collected by a pressure-temperature sensor mounted between the outlet of the indoor evaporator 602 and the inlet of the gas-liquid separator 611. The outlet of the second expansion switch valve 606 is in communication with the inlet of the indoor evaporator 602, and the low-temperature low-pressure liquid is evaporated in the indoor evaporator 602, so that a low-temperature low-pressure gas is generated at the outlet of the indoor evaporator 602, but because of impact of a high-temperature environment, an overheated over-temperature gaseous refrigerant is generated at the outlet of the indoor evaporator 602. Meanwhile, the third throttle branch is closed, and the fourth throttle branch is open. The moderate-temperature high-pressure liquid from the outlet of the outdoor heat exchanger 605 changes into a low-temperature low-pressure gaseous-liquid refrigerant under the throttling action of the second throttle element 623. The gaseous-liquid refrigerant and the foregoing overheated over-temperature gaseous refrigerant converge to perform heat exchange, so that a suction temperature, a discharge temperature, and power consumption of the compressor 604 can be reduced in a high-temperature environment. The indoor evaporator 602 is connected to the gas-liquid separator 611, the liquid that is not evaporated is separated by the gas-liquid separator 611, and finally, the low-temperature low-pressure gas returns to the compressor 604, so that a cycle is formed. In this case, air in the HVAC assembly 600 flows through only the indoor evaporator 602, no air passes through the indoor condenser 601, and the indoor condenser 601 is merely used as a refrigerant passage.

Mode 2: Ordinary-Temperature Refrigerating Mode.

Figure 5:
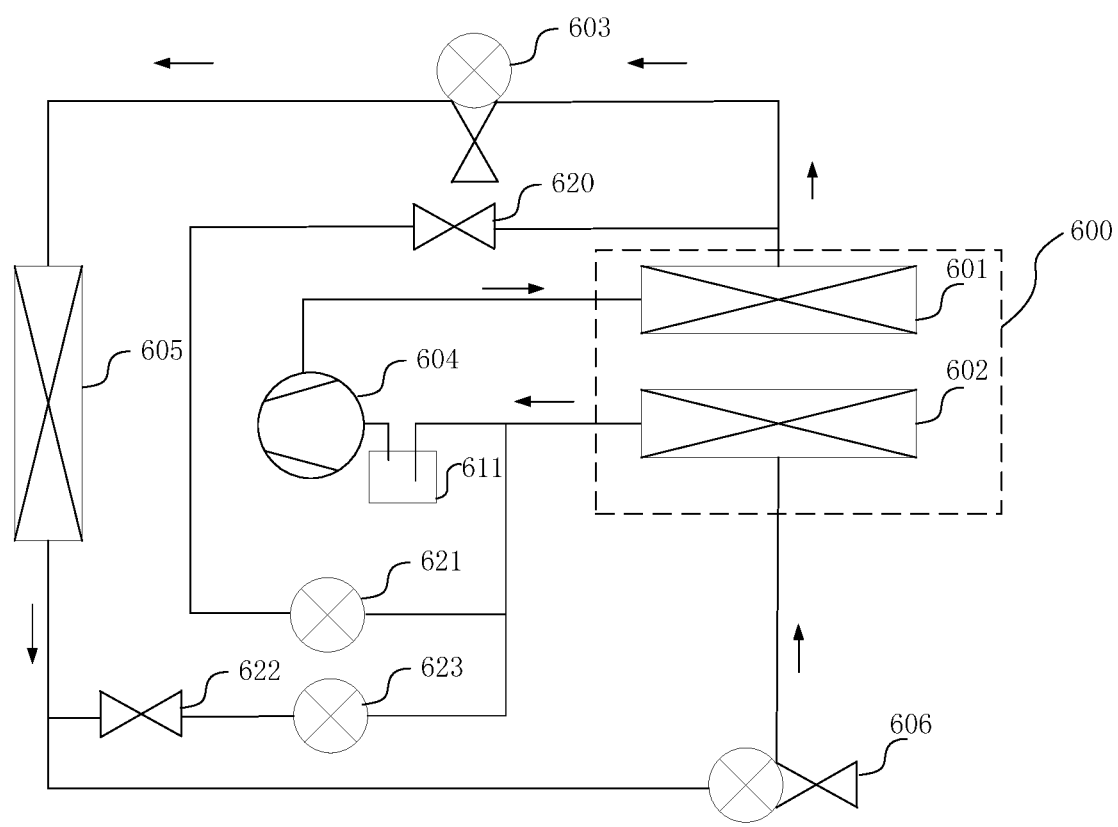
FIG. 5 is a schematic structural diagram of a heat pump air-conditioning system according to another implementation of this disclosure.

When the system is in this mode, the entire system forms an ordinary-temperature refrigerating circulation system. As shown in FIG. 5, in this mode, the entire system is similar to the system in the high-temperature refrigerating mode, and a difference lies in that in this mode, both of the third throttle branch and the fourth throttle branch are closed because at an ordinary temperature, a low-temperature low-pressure gas may be generated at the outlet of the indoor evaporator 602, no overheated over-temperature gaseous refrigerant is generated, so that the throttle function of the fourth throttle branch is not needed. In this way, unnecessary energy waste can be reduced, and the working efficiency of the system can be improved.

Mode 3: Low-Temperature Heating Mode.

Figure 6:
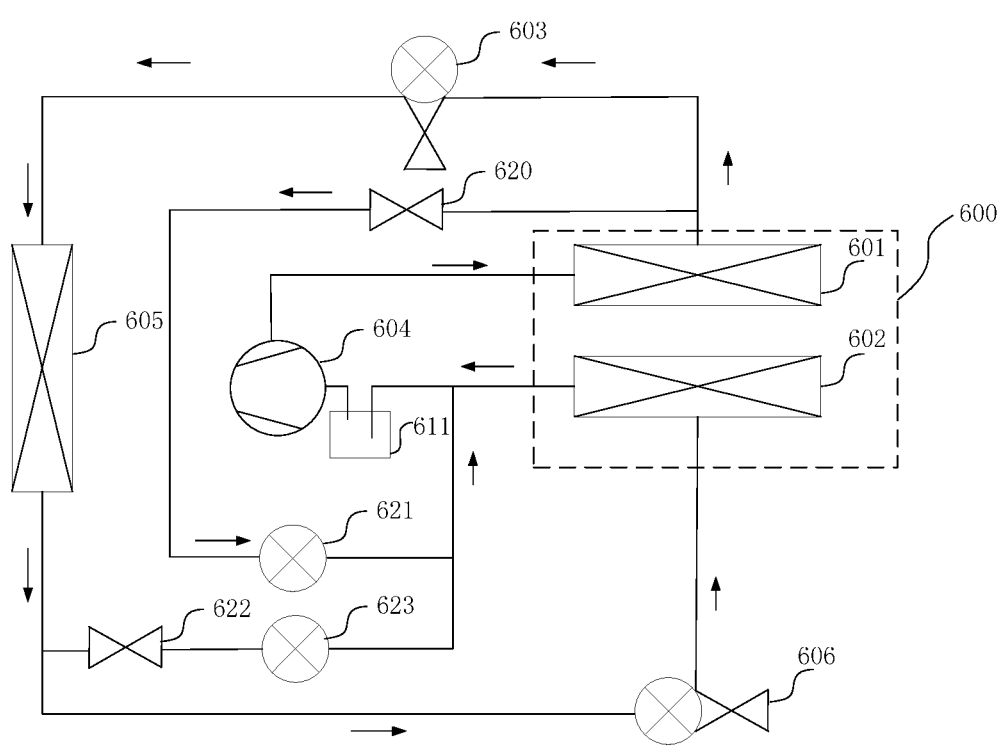
FIG. 6 is a schematic structural diagram of a heat pump air-conditioning system according to another implementation of this disclosure.

When the system is in this mode, the entire system forms a low-temperature heating circulation system. As shown in FIG. 6, first, the compressor 604 discharges a high-temperature high-pressure gas by means of compression, the compressor 604 is connected to the indoor condenser 601, and the high-temperature high-pressure gas is condensed in the indoor condenser 601, so that a moderate-temperature high-pressure liquid is generated at the outlet of the indoor condenser 601. The outlet of the indoor condenser 601 is in communication with the inlet of the first expansion switch valve 603. In this case, the first expansion switch valve 603 implements an expansion valve function, and implements a throttle function as a throttle element, and a low-temperature low-pressure liquid is generated at the outlet thereof. An opening degree of the first expansion switch valve 603 may be set according to actual requirements, and the opening degree may be adjusted according to temperature data (that is, a discharge temperature of the compressor) collected by a pressure-temperature sensor mounted at the outlet of the compressor 604. The outlet of the first expansion switch valve 603 is in communication with the inlet of the outdoor heat exchanger 605, the outdoor heat exchanger 605 absorbs heat from outdoor air, and a low-temperature low-pressure gas is generated at the outlet of the outdoor heat exchanger 605. The outlet of the outdoor heat exchanger 605 is in communication with the inlet of the second expansion switch valve 606. In this case, the second expansion switch valve 606 implements a switch valve function, and is merely used as a passage. The outlet of the second expansion switch valve 606 is in communication with the inlet of the indoor evaporator 602. Air is controlled, by using the damper mechanism, to flow toward only the indoor condenser 601 instead of flowing toward the indoor evaporator 602, so that heat exchange is not performed in the indoor evaporator 602, the indoor evaporator 602 is merely used as a passage, and the low-temperature low-pressure gas remains unchanged at the outlet thereof. However, due to impact of a low-temperature environment, a subcooled over-low-temperature gaseous refrigerant is generated at the outlet of the indoor evaporator 602. Meanwhile, the fourth throttle branch is closed, and the third throttle branch is open. The moderate-temperature high-pressure liquid from the outlet of the outdoor heat exchanger 601 changes into a moderate-temperature low-pressure gaseous-liquid refrigerant under the throttling action of the first throttle element 621. The gaseous-liquid refrigerant and the foregoing subcooled over-low-temperature gaseous refrigerant converge to perform heat exchange, so that a suction amount, a suction temperature, and a discharge temperature of the compressor 604 can be increased in the low-temperature environment, so as to increase an amount of exchanged heat of the indoor condenser 601, thereby improving heating comfort, the system energy efficiency, and the compressor efficiency. The converged gaseous-liquid refrigerant flows to the gas-liquid separator 611, the liquid that is not evaporated is separated by the gas-liquid separator 611, and finally, the low-temperature low-pressure gas returns to the compressor 604, so that a cycle is formed. In this case, air in the HVAC assembly 600 flows through only the indoor condenser 601, no air passes through the indoor evaporator 602, and the indoor evaporator 602 is merely used as a refrigerant passage.

Mode 4: Ordinary-Temperature Heating Mode.

Figure 7:
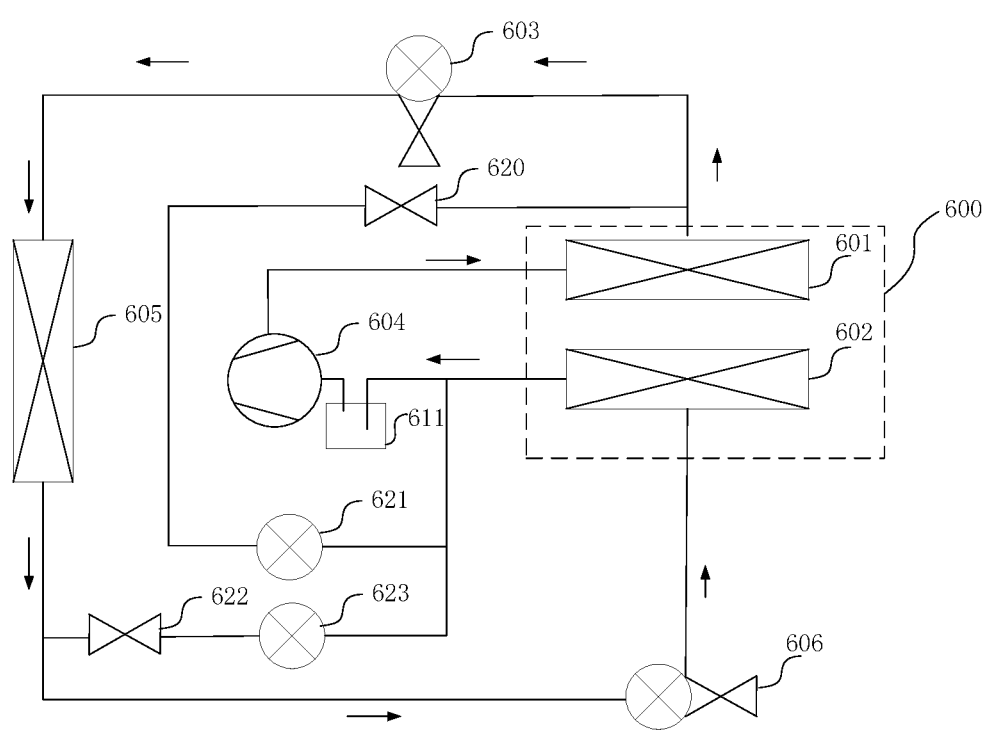
FIG. 7 is a schematic structural diagram of a heat pump air-conditioning system according to another implementation of this disclosure.

When the system is in this mode, the entire system forms an ordinary-temperature heating circulation system. As shown in FIG. 7, in this mode, the entire system is similar to the system in the low-temperature heating mode, and a difference lies in that in this mode, both of the third throttle branch and the fourth throttle branch are closed because at an ordinary temperature, no subcooled over-low-temperature gaseous refrigerant is generated at the outlet of the indoor evaporator 602, so that the throttle function of the third throttle branch is not needed. In this way, unnecessary energy waste can be reduced, and the working efficiency of the system can be improved.

Mode 5: Outdoor Heat Exchanger Defrosting Mode.

As shown in FIG. 5, first, the compressor 604 discharges a high-temperature high-pressure gas by means of compression, and the compressor 604 is connected to the indoor condenser 601. In this case, the indoor condenser 601 is merely used as a passage, and the high-temperature high-pressure gas remains unchanged at the outlet of the indoor condenser 601. The outlet of the indoor condenser 601 is in communication with the inlet of the first expansion switch valve 603. In this case, the first expansion switch valve 603 implements a switch valve function, and is merely used as a passage, and the high-temperature high-pressure gas remains unchanged at the outlet of the first expansion switch valve 603. The outlet of the first expansion switch valve 603 is in communication with the inlet of the outdoor heat exchanger 605, the outdoor heat exchanger 605 exchanges heat with outdoor air, and dissipates heat into air, and a moderate-temperature high-pressure liquid is generated at the outlet of the outdoor heat exchanger 605. The outlet of the outdoor heat exchanger 605 is in communication with the inlet of the second expansion switch valve 606. In this case, the second expansion switch valve 606 implements an expansion valve function, and implements a throttle function as a throttle element, and a low-temperature low-pressure liquid is generated at the outlet thereof. An opening degree of the second expansion switch valve 606 may be set according to actual requirements, and the opening degree may be adjusted by calculating a superheat degree of the refrigerant at the outlet of the evaporator according to pressure and temperature data collected by a pressure-temperature sensor mounted between the outlet of the indoor evaporator 602 and the inlet of the gas-liquid separator 611. The outlet of the second expansion switch valve 606 is in communication with the inlet of the indoor evaporator 602, and a low-temperature and low-pressure gas is generated at the outlet of the indoor evaporator 602. The indoor evaporator 602 is connected to the gas-liquid separator 611, the liquid that is not evaporated is separated by the gas-liquid separator 611, and finally, the low-temperature low-pressure gas returns to the compressor 604, so that a cycle is formed. In this case, both the third throttle branch and the fourth throttle branch are closed. In this case, ventilation of the HVAC assembly 600 does not need to be enabled.

In conclusion, the heat pump air-conditioning system provided in this disclosure can control processes, such as refrigerating and heating, of a vehicle air-conditioning system without changing a refrigerant circulation direction. In addition, a plurality of throttle branches is added to the system to enable the system to have a good refrigerating effect at a high temperature and a good heating effect at a low temperature while having a good defrosting effect. In this disclosure, an air flowing direction in the indoor evaporator and the indoor condenser in the HVAC assembly may be independently controlled and adjusted by using the damper mechanism, that is, during refrigerating, air flows through only the indoor evaporator, no air passes through the indoor condenser, and the indoor condenser is merely used as a refrigerant passage; and during heating, air flows through only the indoor condenser, no air passes through the indoor evaporator, and the indoor evaporator is merely used as a refrigerant passage. In addition, because the heat pump air-conditioning system of this disclosure employs only one outdoor heat exchanger, air resistance against a front end module of a vehicle can be reduced, problems, such as low heating energy efficiency, impossibility in satisfying regulatory requirements for defrosting and defogging, and complex installation, of a vehicle heat pump air-conditioning system of a pure electric vehicle without an excess engine heat circulation system or a hybrid electric vehicle in electric-only mode are resolved, and effects of reducing energy consumption, simplifying a system structure, and facilitating pipeline arrangement are achieved. The heat pump air-conditioning system provided in this disclosure features a simple structure, and therefore, can be easily mass produced.

Figure 8:
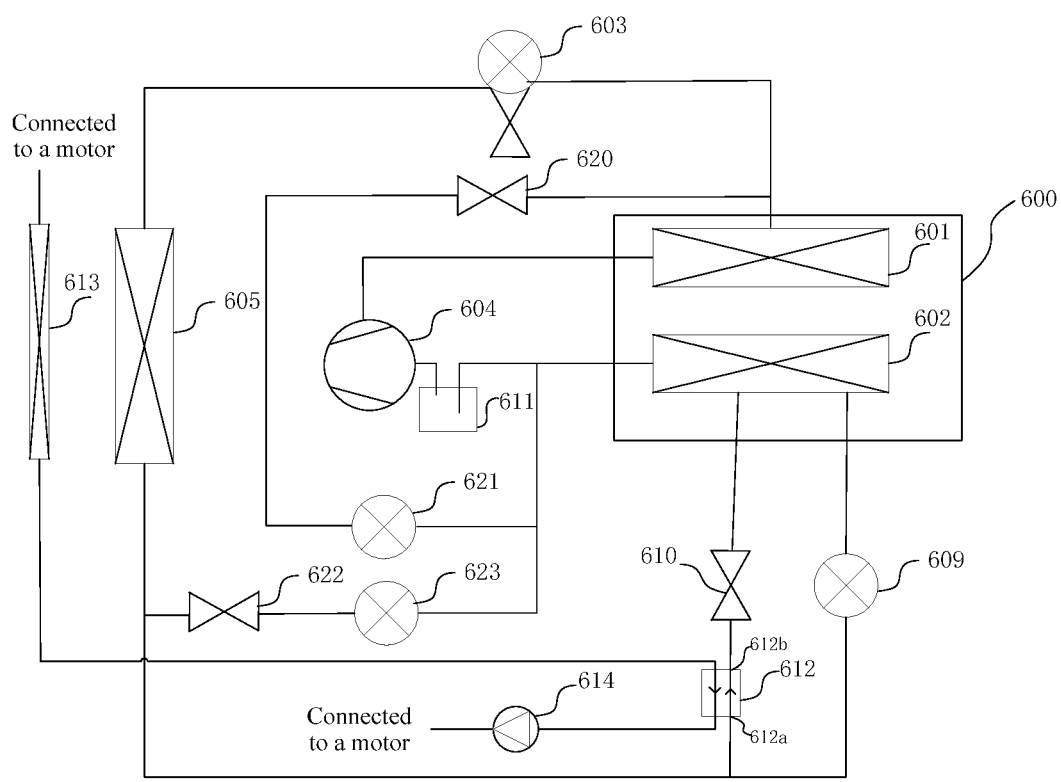
FIG. 8 is a schematic structural diagram of a heat pump air-conditioning system according to another implementation of this disclosure.
Figure 9:
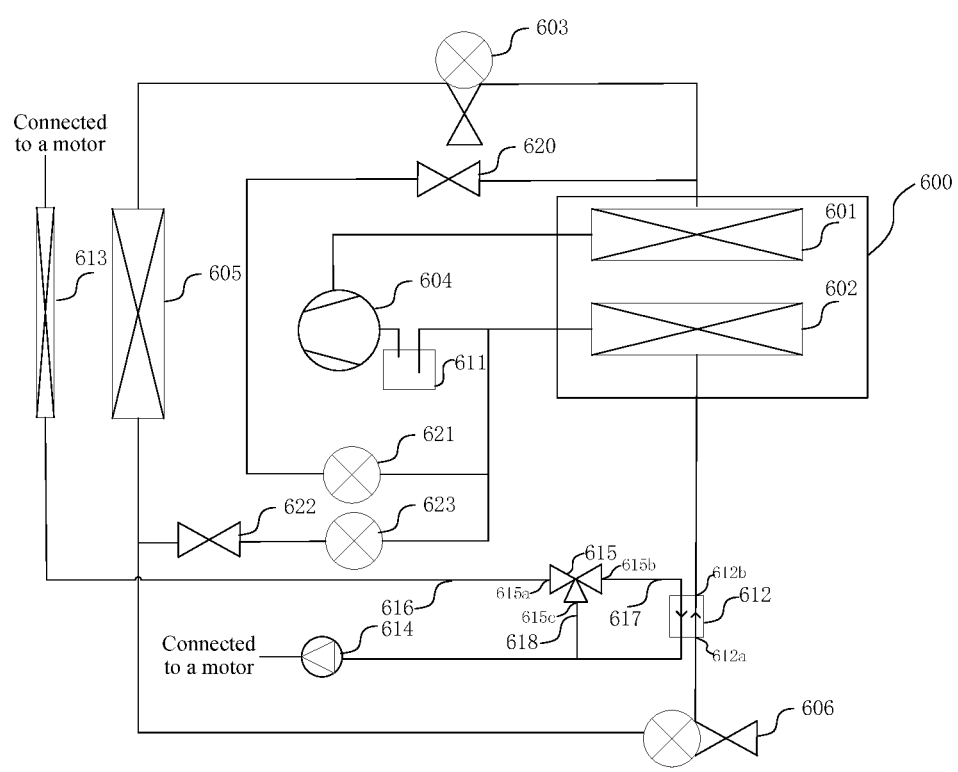
FIG. 9 is a schematic structural diagram of a heat pump air-conditioning system according to another implementation of this disclosure.

In the low-temperature heating mode and the ordinary-temperature heating mode, to improve the heating capability, preferably, as shown in FIG. 8 and FIG. 9, a plate heat exchanger 612 is disposed inside the entire heat pump air-conditioning system, and the plate heat exchanger 612 is also disposed inside a motor cooling system of an electric vehicle. In this way, a refrigerant of the air-conditioning system can be heated by using excess heat of the motor cooling system, thereby improving a suction temperature and a suction amount of the compressor 604.

For example, as shown in FIG. 8, in an implementation in which the second expansion valve 609 and the fourth switch valve 610 are used in the heat pump air-conditioning system, the plate heat exchanger 612 may be disposed inside the second through-flow branch, as shown in FIG. 8. For example, in an implementation, a refrigerant inlet 612a of the plate heat exchanger 612 is in communication with the outlet of the outdoor heat exchanger 605, and a refrigerant outlet 612b of the plate heat exchanger 612 is in communication with an inlet of the fourth switch valve 610. Alternatively, in another implementation (not shown), a refrigerant inlet 612a of the plate heat exchanger 612 may also be in communication with an outlet of the fourth switch valve 610, and a refrigerant outlet 612b of the plate heat exchanger 612 is in communication with the inlet of the indoor evaporator 602.

In addition, the plate heat exchanger 612 is also disposed inside the motor cooling system. As shown in FIG. 8, the motor cooling system may include a motor, a motor heat dissipator 613, and a water pump 614 that are connected in series to the plate heat exchanger 612 to form a loop. In this way, the refrigerant can perform heat exchange with a coolant in the motor cooling system by using the plate heat exchanger 612. After passing through the fourth switch valve 610 and the indoor evaporator 602, the low-temperature low-pressure gas remains unchanged at the outlet of the indoor evaporator 602. In this case, the fourth switch valve 610 and the indoor evaporator 602 are merely used as passages.

Alternatively, as shown in FIG. 9, in an implementation in which the second expansion switch valve 606 is used in the heat pump air-conditioning system, a refrigerant inlet 612a of the plate heat exchanger 612 is in communication with the outlet of the second expansion switch valve 606, a refrigerant outlet 612b of the plate heat exchanger 612 is in communication with the inlet of the indoor evaporator 602, and the plate heat exchanger 612 is also disposed inside the motor cooling system of the electric vehicle. In this way, the refrigerant can perform heat exchange with a coolant in the motor cooling system by using the plate heat exchanger 612.

The heating capability of the air-conditioning system in the low-temperature heating mode and the ordinary-temperature heating mode can be improved by using the plate heat exchanger 612.

However, as shown in FIG. 9, in the implementation in which the second expansion switch valve 606 is used in the heat pump air-conditioning system, to avoid heating the refrigerant in the high-temperature refrigerating mode and the outdoor heat exchanger defrosting mode, a valve may be used to control whether heat exchange is performed in the plate heat exchanger 612. Specifically, the motor cooling system may include a coolant trunk 616, a first coolant branch 617, and a second coolant branch 618, a first end of the coolant trunk 616 is selectively in communication with a first end of the first coolant branch 617 or a first end of the second coolant branch 618. For example, in an implementation, the first end of the coolant trunk 616 may be in communication with an inlet 615a of a three-way valve 615, the first end of the first coolant branch 617 may be in communication with a first outlet 615b of the three-way valve 615, the first end of the second coolant branch 618 may be in communication with a second outlet 615c of the three-way valve 615. Therefore, the first end of the coolant trunk 616 may be controlled, by using the three-way valve 615, to be selectively in communication with the first end of the first coolant branch 617 or the first end of the second coolant branch 618. In addition, as shown in FIG. 9, a second end of the first coolant branch 617 is in communication with a second end of the coolant trunk 616, and a second end of the second coolant branch 618 is also in communication with the second end of the coolant trunk 616; a motor, a motor heat dissipator 613, and a water pump 614 are connected in series to the coolant trunk 616, and the plate heat exchanger 612 is connected in series to the first coolant branch 617.

In this way, when the air-conditioning system works in the low-temperature heating mode or the ordinary-temperature heating mode, to improve the heating capability, the refrigerant needs to be heated in the plate heat exchanger 612. Therefore, in this case, the first coolant branch 617 may be opened by controlling the three-way valve 615, so that the coolant in the motor cooling system flows through the plate heat exchanger 612. In this case, heat exchange with the refrigerant can be implemented. However, when the system works in the high-temperature refrigerating mode, the ordinary-temperature refrigerating mode, or the outdoor heat exchanger defrosting mode, the refrigerant does not need to be heated in the plate heat exchanger 612. Therefore, in this case, the second coolant branch 618 may be opened by controlling the three-way valve 615, so that the coolant in the motor cooling system does not flow through the plate heat exchanger 612. In this case, the plate heat exchanger 612 is merely used as a passage of the refrigerant.

In the heat pump air-conditioning system provided in this disclosure, various refrigerants, such as R134a, R410a, R32, and R290, may be used. Preferably, a moderate- and high-temperature refrigerant is used.

Figure 10:
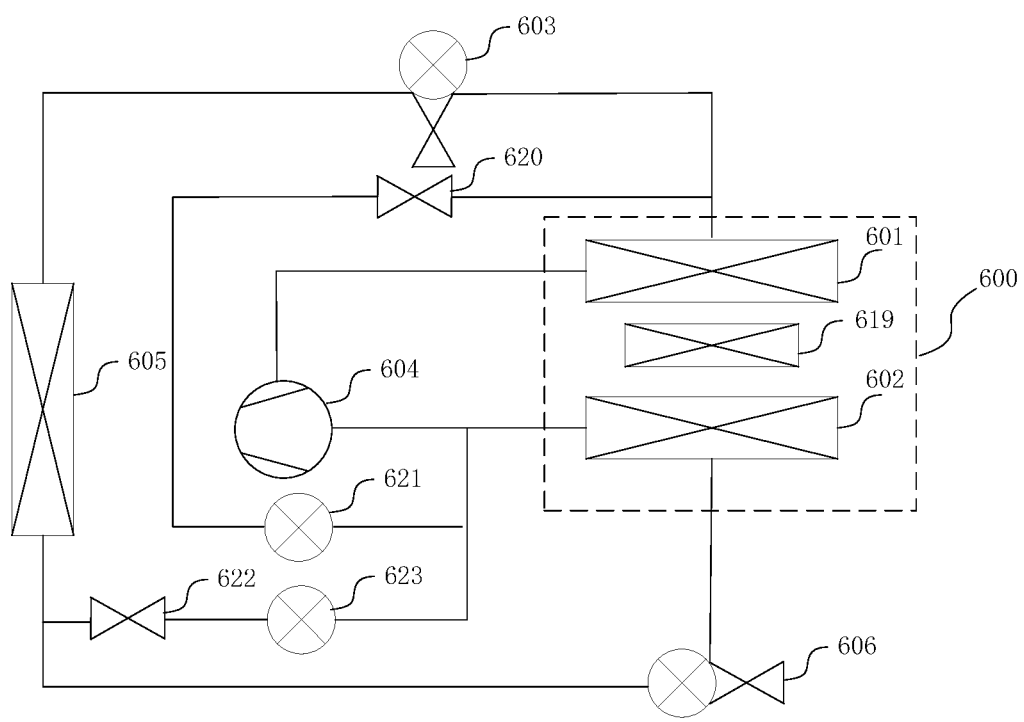
FIG. 10 is a schematic structural diagram of a heat pump air-conditioning system according to another implementation of this disclosure.

FIG. 10 is a schematic structural diagram of a heat pump air-conditioning system according to another implementation of this disclosure. As shown in FIG. 10, the HVAC assembly 600 may further include a PTC heater 619, and the PTC heater 619 is used for heating air flowing through the indoor condenser 601.

In this disclosure, the PTC heater 619 may be a high-voltage PTC heater (which is driven by high-voltage batteries in the entire vehicle), and a voltage range is 200 V to 900 V. Alternatively, the PTC heater 619 may be a low-voltage PTC heater (which is driven by a 12 V- or 24 V-storage battery), and a voltage range is 9 V to 32 V. In addition, the PTC heater 619 may be a complete core formed by several strip-shaped or several block-shaped PTC ceramic wafer modules and a heat dissipation fin, or may be a strip-shaped or block-shaped PTC ceramic wafer module having a heat dissipation fin.

In this disclosure, the PTC heater 619 may be disposed on a windward side or a leeward side of the indoor condenser 601. In addition, to improve an effect of heating air flowing through the indoor condenser 601, the PTC heater 619 may be disposed in parallel to the indoor condenser 601. In other implementations, the PTC heater 619 may alternatively be disposed at a foot blowing air vent and a defrosting vent of a box of the HVAC assembly 600, or may be disposed at an air vent of a defrosting ventilation channel.

If the PTC heater 619 is disposed on the windward side or the leeward side of the indoor condenser 601 in the box and is disposed in parallel to the indoor condenser 601, a groove may be dug on a housing of the box, and the PTC heater 619 is perpendicularly inserted into the box; alternatively, a support may be welded on a sideboard of the indoor condenser 601, and the PTC heater 619 is fastened to the support of the indoor condenser 601 by using screws. If the PTC heater 619 is disposed at the foot blowing air vent and the defrosting vent of the box or is disposed at the air vent of the defrosting ventilation channel, the PTC heater 619 may be directly fastened to the air outlets of the box and the air vent of the ventilation channel by using screws.

According to the implementation, when the temperature outside the vehicle is too low and a heating amount in the low-temperature heating mode of the heat pump air-conditioning system cannot satisfy a requirement in the vehicle, the PTC heater 619 may be run to assist heating. Therefore, disadvantages, such as a small heating amount, slow entire-vehicle defrosting and defogging, and a poor heating effect, of the heat pump air-conditioning system in the low-temperature heating mode can be eliminated.

As described above, in this disclosure, the expansion switch valve is a valve having both an expansion valve function and a switch valve function, and may be considered as a combination of a switch valve and an expansion valve. An exemplary implementation of the expansion switch valve is provided below.

Figure 11:
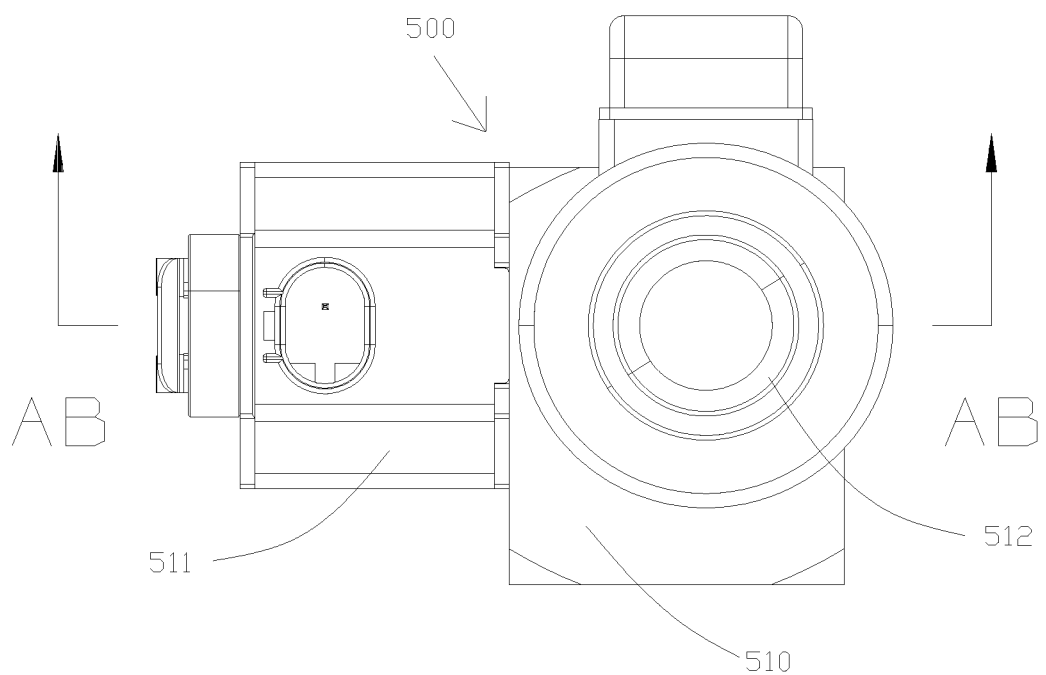
FIG. 11 is a schematic top structural view of an expansion switch valve according to a preferred implementation of this disclosure.

As shown in FIG. 11, the foregoing mentioned expansion switch valve may include a valve body 500, where an inlet 501, an outlet 502, and an internal passage in communication between the inlet 501 and the outlet 502 are formed on the valve body 500, a first valve plug 503 and a second valve plug 504 are mounted on the internal passage, the first valve plug 503 makes the inlet 501 and the outlet 502 in direct communication or out of communication, and the second valve plug 504 makes the inlet 501 and the outlet 502 in communication through a throttle port 505 or out of communication.

The "direct communication" implemented by the first valve plug means that the refrigerant entered from the inlet 501 of the valve body 500 can bypass the first valve plug and directly flow to the outlet 502 of the valve body 500 through the internal passage without being affected, and the "out of communication" implemented by the first valve plug means that the refrigerant entered from the inlet 501 of the valve body 500 cannot bypass the first valve plug and cannot flow to the outlet 502 of the valve body 500 through the internal passage. The "communication through a throttle port" implemented by the second valve plug means that the refrigerant entered from the inlet 501 of the valve body 500 can bypass the second valve plug and flow to the outlet 502 of the valve body 500 after being throttled by a throttle port, and the "out of communication" implemented by the second valve plug means that the refrigerant entered from the inlet 501 of the valve body 500 cannot bypass the second valve plug and cannot flow to the outlet 502 of the valve body 500 through the throttle port 505.

In this way, the expansion switch valve in this disclosure can achieve at least three states of the refrigerant entered from the inlet 501 by controlling the first valve plug and the second valve plug: (1) a closed state; (2) a direct communication state by bypassing the first valve plug 503; and (3) a throttled communication manner by bypassing the second valve plug 504.

After being throttled by the throttle port 505, a high-temperature high-pressure liquid refrigerant may become a low-temperature low-pressure atomized liquid refrigerant. This creates a condition for evaporation of the refrigerant. That is, a cross sectional area of the throttle port 505 is smaller than a cross sectional area of the outlet 502, and an opening degree of the throttle port 505 may be adjusted by controlling the second valve plug, to control an amount of flow passing through the throttle port 505, thereby avoiding insufficient refrigeration caused by an excessively small amount of refrigerant and avoiding a liquid slugging phenomenon in the compressor that is caused by an excessively large amount of refrigerant. That is, cooperation between the second valve plug 504 and the valve body 500 can make the expansion switch valve have the expansion valve function.

In this way, an opening/closure control function and/or a throttle control function of the inlet 501 and the outlet 502 can be implemented by mounting the first valve plug 503 and the second valve plug 504 on the internal passage of the same valve body 500. A structure is simple, and production and installation are easy. In addition, when the expansion switch valve provided in this disclosure is applied to a heat pump system, a filling amount of refrigerant of the entire heat pump system is reduced, costs are reduced, pipeline connections are simplified, and oil return of the heat pump system is facilitated.

As an exemplary internal installation structure of the valve body 500, as shown in FIG. 11 to FIG. 16, the valve body 500 includes a valve base 510 that forms an internal passage and a first valve housing 511 and a second valve housing 512 that are mounted on the valve base 510. A first electromagnetic drive portion 521 used for driving the first valve plug 503 is mounted in the first valve housing 511, and a second electromagnetic drive portion 522 used for driving the second valve plug 504 is mounted in the second valve plug 504. The first valve plug 503 extends from the valve housing 511 to the internal passage inside the valve base 510, and the second valve plug 504 extends from an end proximal to the second valve housing 512 to the internal passage inside the valve base 510.

A location of the first valve plug 503 can be easily controlled by controlling power-on or power-off of the first electromagnetic drive portion 521 (for example, an electromagnetic coil), to control direct-communication or out-of-communication between the inlet 501 and the outlet 502. A location of the second valve plug 504 can be easily controlled by controlling power-on or power-off of the second electromagnetic drive portion 522 (for example, an electromagnetic coil), to control whether the inlet 501 and the outlet 502 are in communication with the throttle port 505. In other words, an electronic expansion valve and an electromagnetic valve that share the inlet 501 and the outlet 502 are connected in parallel and mounted in the valve body 500. Therefore, automated control on opening/closure and/or throttling of the expansion switch valve can be implemented, and pipeline arrangement can be simplified.

To fully use spatial locations of the expansion switch valve in different directions and avoid connections between the expansion switch valve and different pipelines from interfering with each other, the valve base 510 is of a polyhedral structure, the first valve housing 511, the second valve housing 512, the inlet 501, and the outlet 502 are respectively disposed on different surfaces of the polyhedral structure, installation directions of the first valve housing 511 and the second valve housing 512 are perpendicular to each other, and opening directions of the inlet 501 and the outlet 502 are perpendicular to each other. In this way, inlet and outlet pipelines can be connected to the different surfaces of the polyhedral structure, thereby avoiding a problem of disordered and twisted pipeline arrangement.

As a typical internal structure of the expansion switch valve, as shown in FIG. 11 to FIG. 14, the internal passage includes a first passage 506 and a second passage 507 that are separately in communication with the inlet 501, a first valve port 516 fitting the first valve plug 503 is formed on the first passage 506, the throttle port 505 is formed on the second passage 507 to form a second valve port 517 fitting the second valve plug 504, and the first passage 506 and the second passage 507 converge downstream of the second valve port 517 and are in communication with the outlet 502.

That is, the first valve port 516 is opened or closed by changing the location of the first valve plug 503, to control closure or opening of the first passage 506 in communication between the inlet 501 and the outlet 502, thereby implementing the opening or closure function of the electromagnetic valve described above. Similarly, the second valve port 517 is open or closed by changing the location of the second valve plug 504, thereby implementing the throttle function of the electronic expansion valve.

Figure 15:
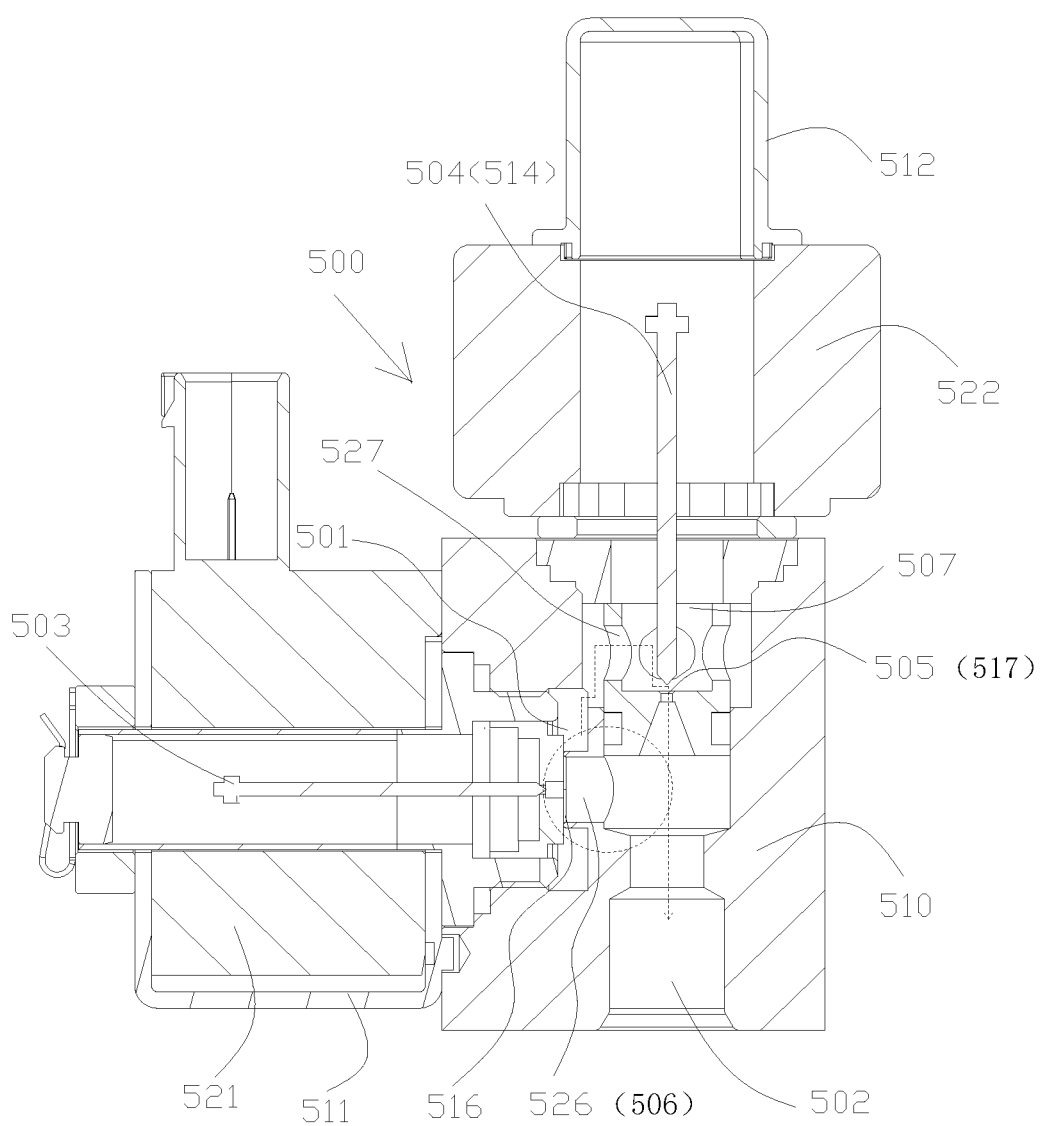
FIG. 15 is a schematic sectional structural view along a midline AB-AB in FIG. 11, where a first valve port is in a closed state, and a second valve port is in an open state.
Figure 16:
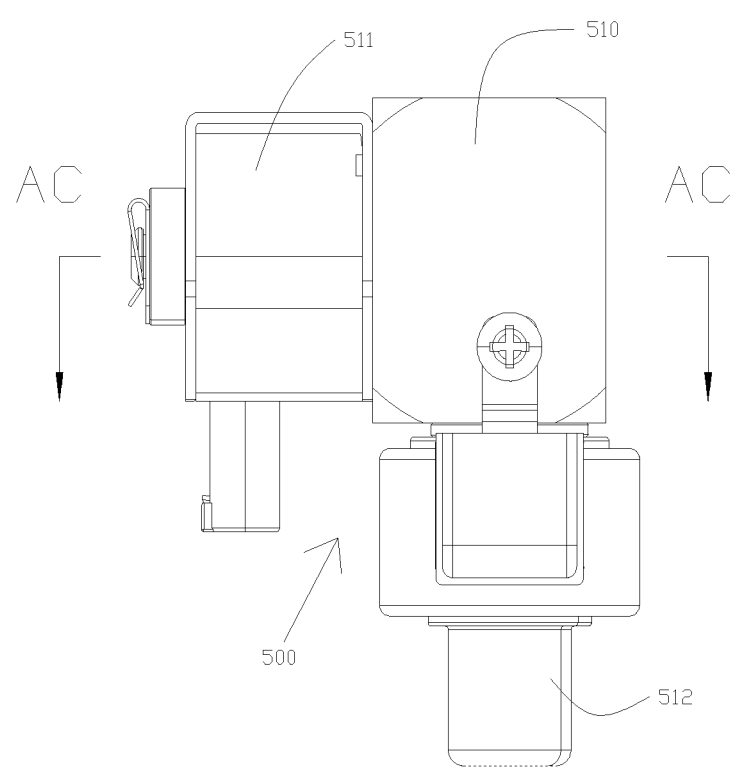
FIG. 16 is a schematic front structural view of an expansion switch valve from another perspective according to a preferred implementation of this disclosure.

The first passage 506 and the second passage 507 can be respectively in communication with the inlet 501 and the outlet 502 in any suitable arrangement manner. To reduce an overall occupied space of the valve body 500, as shown in FIG. 15, the second passage 507 and the outlet 502 are provided toward a same direction, the first passage 506 is formed as a first through hole 526 perpendicular to the second passage 507, the inlet 501 is in communication with the second passage 507 through a second through hole 527 provided on a sidewall of the second passage 507, and the first through hole 526 and the second through hole 527 are separately in communication with the inlet 501. The first through hole 526 and the second through hole 527 are spatially disposed perpendicularly to each other or in parallel to each other. This is not limited in this disclosure, and belongs to the protection scope of this disclosure.

Figure 18:
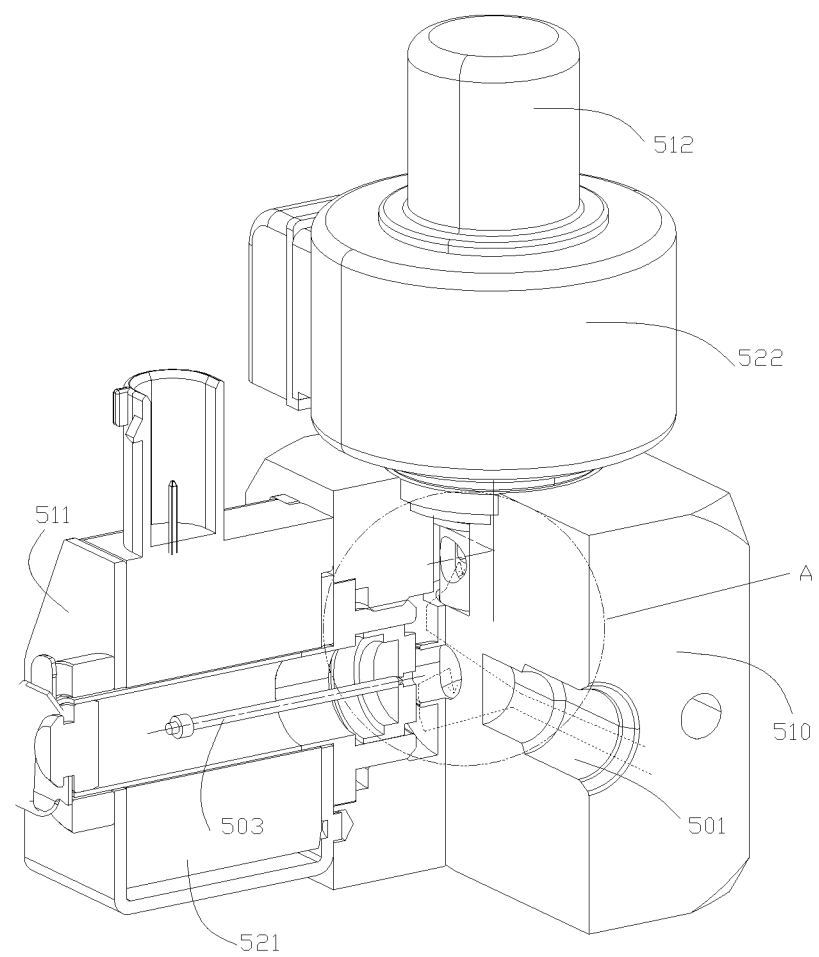
FIG. 18 is a first schematic internal structural diagram of an expansion switch valve according to a preferred implementation of this disclosure, where a first valve port and a second valve port are both in an open state.
Figure 19:
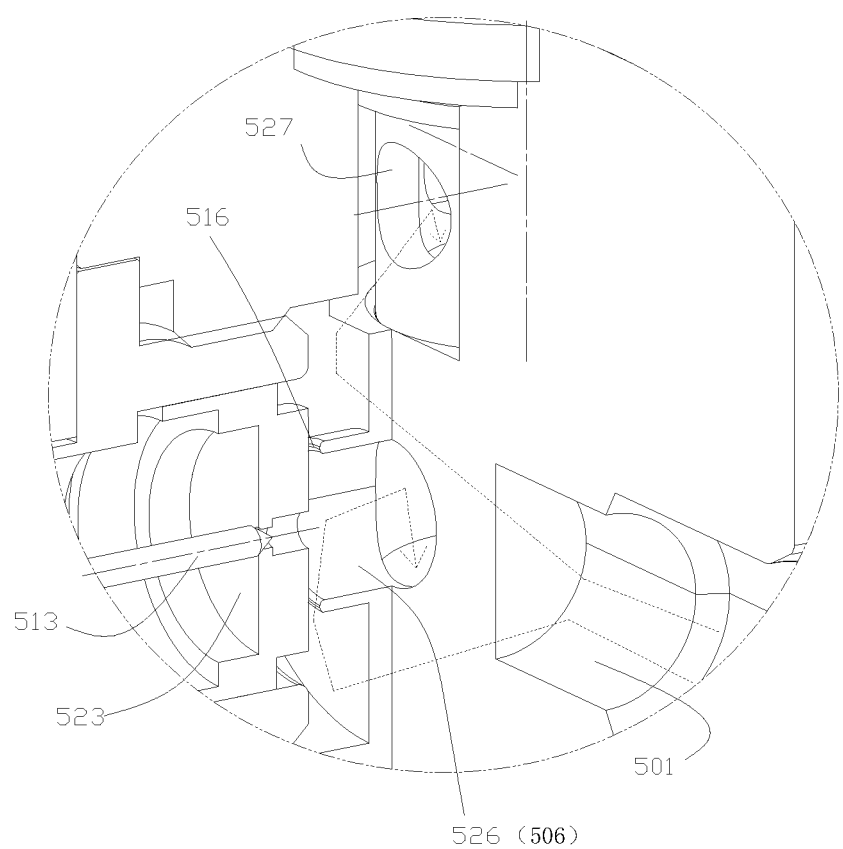
FIG. 19 is a partial enlarged diagram of a part A in FIG. 18.
Figure 20:
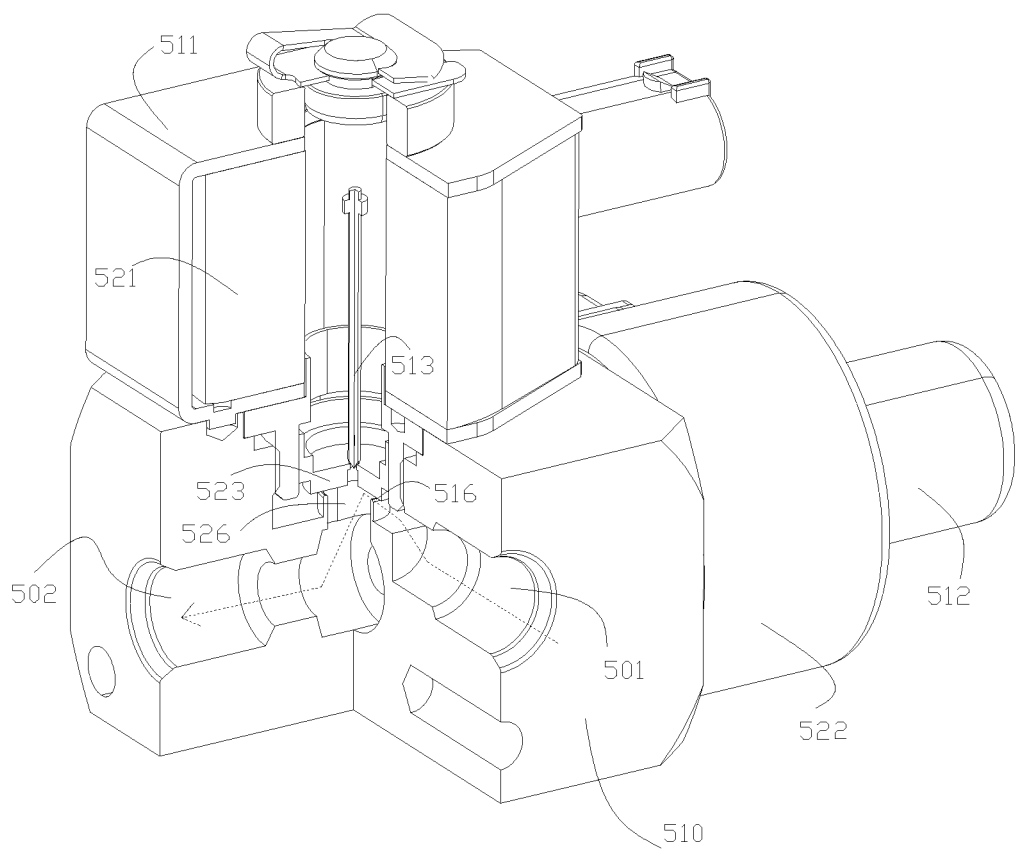
FIG. 20 is a second schematic internal structural diagram of an expansion switch valve according to a preferred implementation of this disclosure, where a first valve port is in an open state, and a second valve port is in a closed state.

To further reduce the overall occupied space of the valve body 500, as shown in FIG. 18 to FIG. 21, the inlet 501 and the outlet 502 are provided on the valve body 500 perpendicularly to each other. In this way, as shown in FIG. 18 to FIG. 20, every two of an axis of the inlet 501, an axis of the outlet 502 (that is, an axis of the second passage 507), and an axis of the first passage 506 are set perpendicularly to each other, to avoid interference caused by movements of the first valve plug 503 and the second valve plug 504, and maximize utilization of an inner space of the valve body 500.

Figure 14:
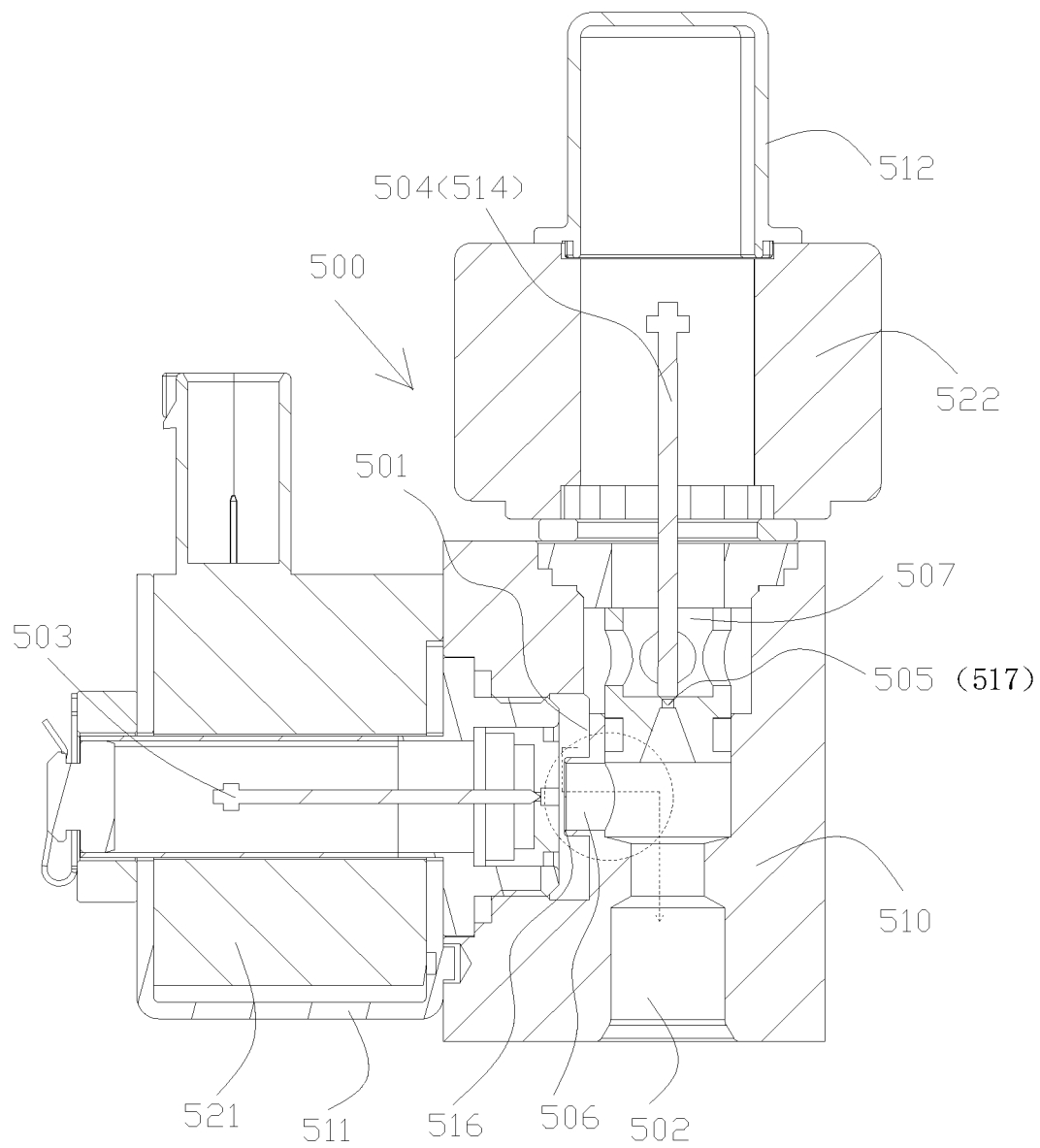
FIG. 14 is a schematic sectional structural view along a midline AB-AB in FIG. 11, where a first valve port is in an open state, and a second valve port is in a closed state.

As shown in FIG. 14 and FIG. 15, to easily close and open the first valve port 516, the first valve plug 503 is disposed coaxially with the first valve port 516 along a moving direction, to selectively plug up or detach from the first valve port 516.

To easily close and open the second valve port 517, the second valve plug 504 is disposed coaxially with the second valve port 517 along a moving direction, to selectively plug up or detach from the second valve port 517.

Figure 17:
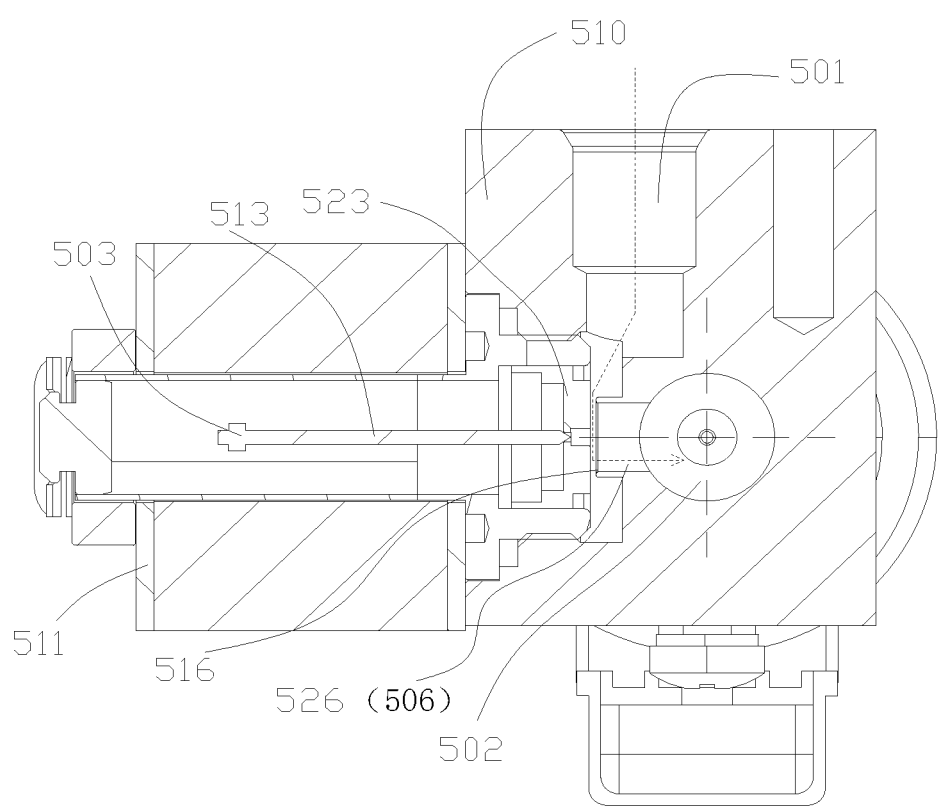
FIG. 17 is a schematic sectional structural view along a midline AC-AC in FIG. 16, where a first valve port is in an open state, and a second valve port is in a closed state.

As shown in FIG. 17, to ensure reliability of plugging up the first passage 506 by using the first valve plug 503, the first valve plug 503 may include a first valve stem 513 and a first plug 523 connected to an end portion of the first valve stem 513, and the first plug 523 is used for pressing against an end face of the first valve port 516 in a sealing manner to plug up the first passage 506.

To easily adjust the opening degree of the throttle port 505 of the expansion switch valve, as shown in FIG. 14 and FIG. 15, the second valve plug 504 includes a second valve stem 514, an end portion of the second valve stem 514 is formed as a conical head structure, and the second valve port 517 is formed as a conical hole structure fitting the conical head structure.

The opening degree of the throttle port 505 of the expansion switch valve may be adjusted by moving the second valve plug 504 upward and downward, and the upward and downward moving of the second valve plug 504 may be adjusted by using the second electromagnetic drive portion 522. If the opening degree of the throttle port 505 of the expansion switch valve is zero, as shown in FIG. 14, the second valve plug 504 is located at a lowest location, the second valve plug 504 plugs up the second valve port 517, and none of the refrigerant can pass through the throttle port 505, that is, the second valve port 517. If the throttle port 505 of the expansion switch valve has an opening degree, as shown in FIG. 15, there is a gap between the conical head structure of the end portion of the second valve plug 504 and the throttle port 505, and the refrigerant flows to the outlet 502 after being throttled. If the opening degree of the throttle port 505 of the expansion switch valve needs to be increased, the second electromagnetic drive portion 522 may be controlled to move the second valve plug 504 upward, to make the conical head structure depart from the throttle port 505, so that the opening degree of the throttle port 505 is increased. In contrast, when the opening degree of the throttle port 505 of the expansion switch valve needs to be decreased, the second valve plug 504 may be driven to move downward.

During use, when only the electromagnetic valve function of the expansion switch valve needs to be used, as shown in FIG. 14, FIG. 17, and FIG. 20, the first valve plug 503 detaches from the first valve port 516, the first valve port 516 is in an open state, the second valve plug 504 is located at a lowest location, and the second valve plug 504 plugs up a throttle port 505, so that the refrigerant that flows from the inlet 501 to the internal passage cannot pass through the throttle port 505, and can only flow into the outlet 502 through the first valve port 516 and the first through hole 526 in sequence. When the electromagnetic valve is powered off, the first valve plug 503 moves leftward, and the first plug 523 is separated from the first valve port 516, so that the refrigerant may pass through the first through hole 526. When the electromagnetic valve is powered on, the first valve plug 503 moves rightward, and the first plug 523 is in close contact with the first valve port 516, so that the refrigerant cannot pass through the first through hole 526.

It should be noted that in FIG. 14 and FIG. 20, a dashed line with an arrow indicates a flowing route and a direction of the refrigerant when the electromagnetic valve function is used.

Figure 21:
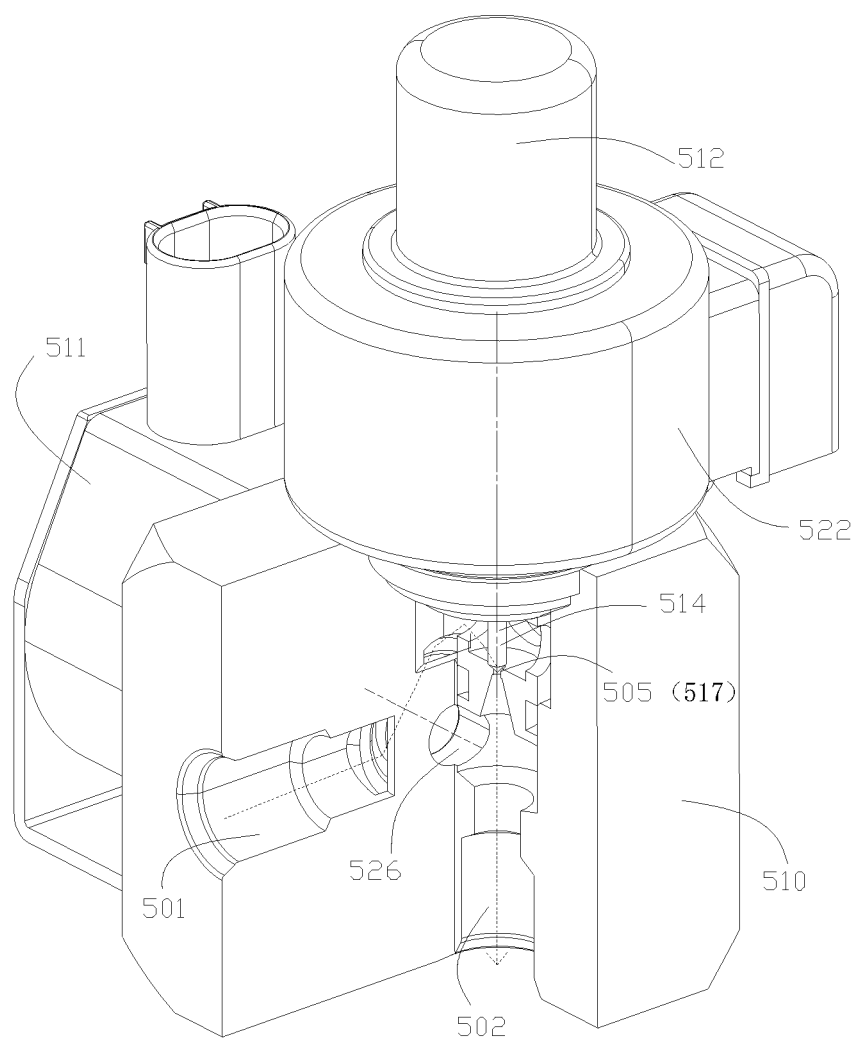
FIG. 21 is a third schematic internal structural diagram of an expansion switch valve according to a preferred implementation of this disclosure, where a first valve is port in a closed state, and a second valve port is in an open state.

When only the electronic expansion valve function of the expansion switch valve needs to be used, as shown in FIG. 15 and FIG. 21, the second valve port 517, that is, the throttle port 505, is in an open state, and the first valve plug 503 plugs up the first valve port 516, so that the refrigerant that flows from the inlet 501 to the internal passage cannot pass through the first through hole 526, and can only flows to the outlet 502 through the second through hole 527 and the throttle port 505 in sequence, and the opening degree of the throttle port 505 can be adjusted by moving the second valve plug 504 upward and downward.

It should be noted that in FIG. 15 and FIG. 21, a dashed line with an arrow indicates a flowing route and a direction of the refrigerant when the electronic expansion valve function is used.

Figure 12:
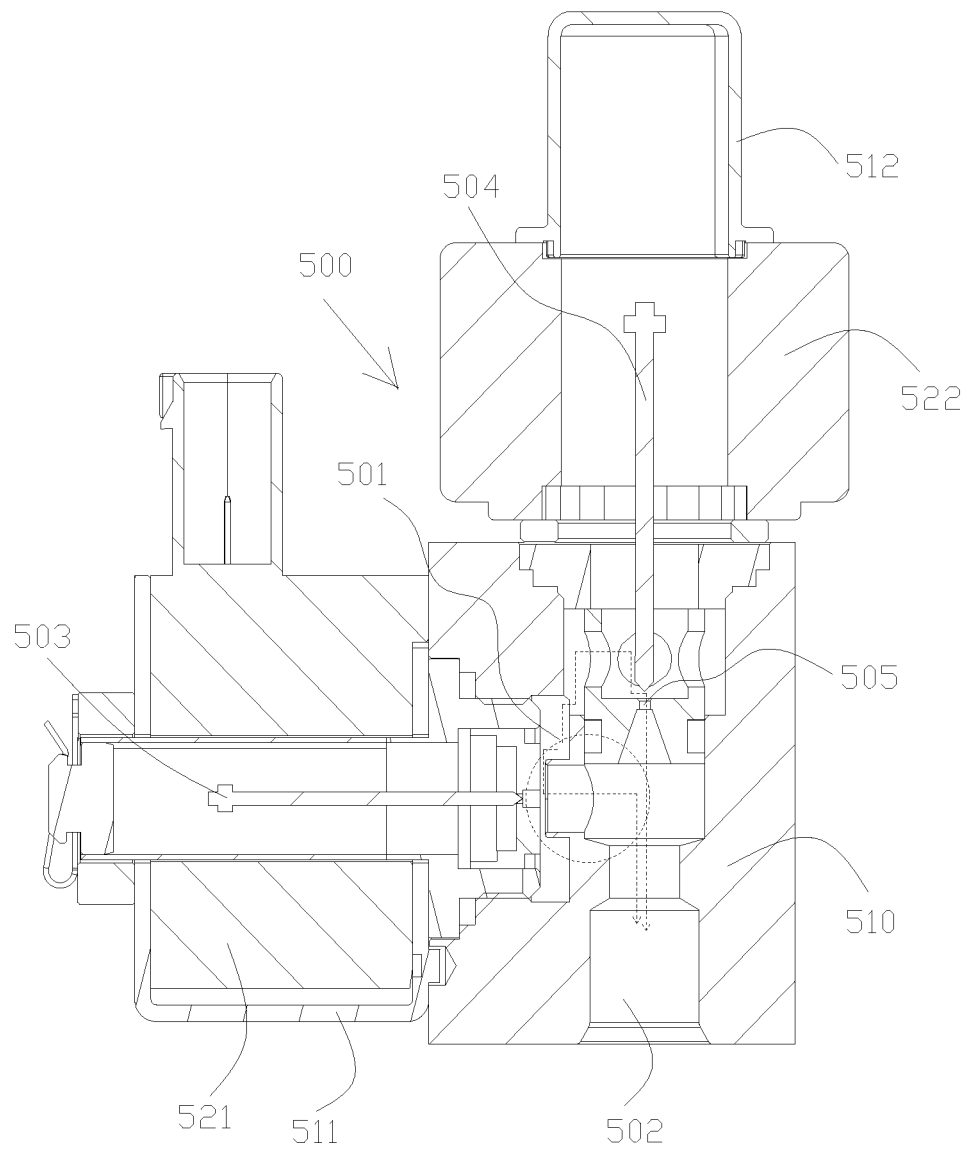
FIG. 12 is a schematic sectional structural view along a midline AB-AB in FIG. 11, where a first valve port and a second valve port are both in an open state.
Figure 13:
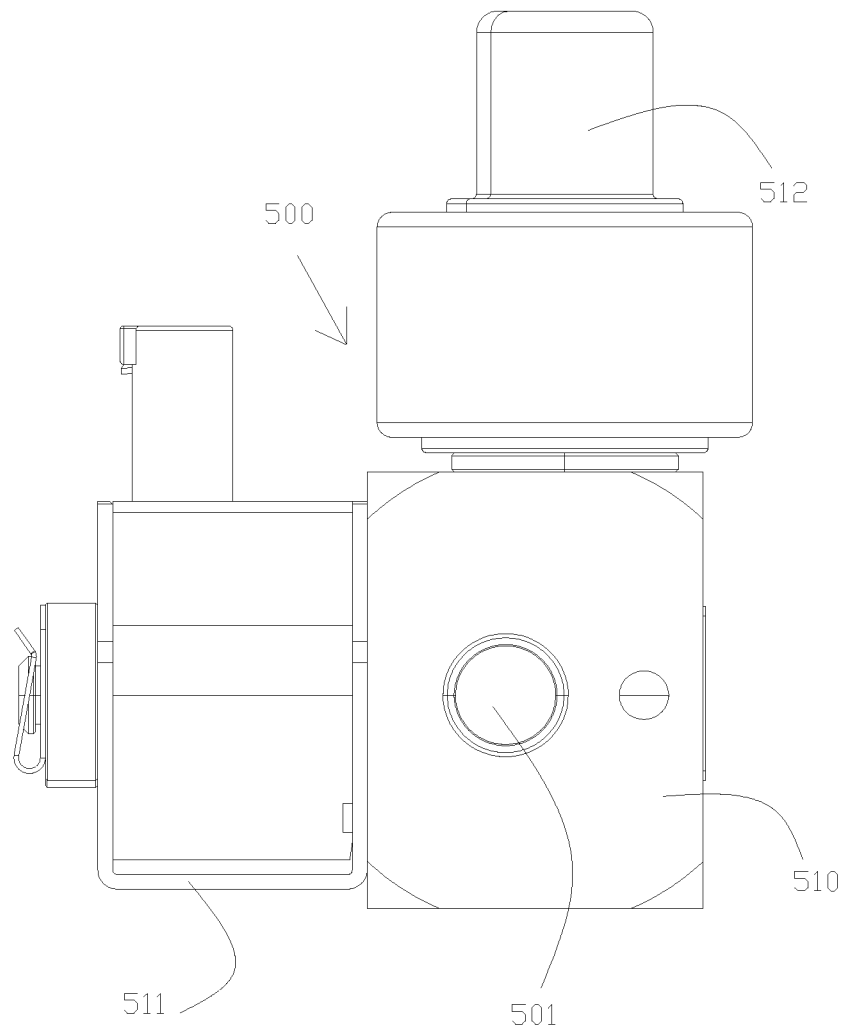
FIG. 13 is a schematic front structural view of an expansion switch valve from a perspective according to a preferred implementation of this disclosure.

When both the electromagnetic valve function and the electronic expansion valve function of the expansion switch valve need to be used, as shown in FIG. 12, FIG. 18, and FIG. 19, a dashed line with an arrow indicates a flowing route and a direction of the refrigerant, the first valve plug 503 detaches from the first valve port 516, the first valve port 516 is in an open state, and the throttle port 505 is in an open state, so that the refrigerant that flows to the internal passage may flow to the outlet 502 separately through the first passage 506 and the second passage 507. Therefore, the expansion switch valve has both the electromagnetic valve function and the electronic expansion valve function.

It should be understood that the foregoing implementation is merely an example of the expansion switch valve, and is not intended to limit this disclosure. Other expansion switch valves having both the expansion valve function and the switch valve function are also applicable to this disclosure.

This disclosure further provides an electric vehicle, including the heat pump air-conditioning system according to this disclosure. The electric vehicle may be a pure electric vehicle, a hybrid electric vehicle, and a fuel cell vehicle.

Although preferred implementations of this disclosure are described in detail above with reference to the accompanying drawings, this disclosure is not limited to specific details in the foregoing implementations. Various simple variations can be made to the technical solutions of this disclosure within the scope of the technical idea of the present invention, and such simple variations all fall within the protection scope of this disclosure.

It should be further noted that the specific technical features described in the foregoing specific implementations can be combined in any appropriate manner provided that no conflict occurs. To avoid unnecessary repetition, various possible combination manners will not be otherwise described in this disclosure.

In addition, various different implementations of this disclosure may alternatively be combined randomly. Such combinations should also be considered as the content disclosed in this disclosure provided that these combinations do not depart from the concept of this disclosure.

What is claimed is:

1. A heat pump air-conditioning system, comprising: a Heating Ventilation and Air Conditioning (HVAC) assembly, a compressor, and an outdoor heat exchanger, wherein the HVAC assembly comprises an indoor condenser, an indoor evaporator, and a damper mechanism, the damper mechanism is used for selectively opening a ventilation channel to the indoor condenser or a ventilation channel to the indoor evaporator, an outlet of the compressor is in communication with an inlet of the indoor condenser, an outlet of the indoor condenser is in communication with an inlet of the outdoor heat exchanger selectively through a first throttle branch or a first through-flow branch, an outlet of the outdoor heat exchanger is in communication with an inlet of the indoor evaporator selectively through a second throttle branch or a second through-flow branch, an outlet of the indoor evaporator is in communication with an inlet of the compressor, the outlet of the indoor condenser is further in communication with the inlet of the compressor through a third throttle branch that is selectively open or closed, and the outlet of the outdoor heat exchanger is further in communication with the inlet of the compressor through a fourth throttle branch that is selectively open or closed.

2. The heat pump air-conditioning system according to claim 1, wherein a first switch valve and a first throttle element are connected in series to the third throttle branch, and a second switch valve and a second throttle element are connected in series to the fourth throttle branch.

3. The heat pump air-conditioning system according to claim 2, wherein the first throttle element is a capillary tube or an expansion valve, and the second throttle element is a capillary tube or an expansion valve.

4. The heat pump air-conditioning system according to claim 1, wherein the first through-flow branch is provided with a third switch valve, and the first throttle branch is provided with a first expansion valve.

5. The heat pump air-conditioning system according to claim 1, wherein the heat pump air-conditioning system further comprises a first expansion switch valve, an inlet of the first expansion switch valve is in communication with the outlet of the indoor condenser, an outlet of the first expansion switch valve is in communication with the inlet of the outdoor heat exchanger, the first throttle branch is a throttle passage of the first expansion switch valve, and the first through-flow branch is a through-flow passage of the first expansion switch valve.

6. The heat pump air-conditioning system according to claim 1, wherein the second through-flow branch is provided with a fourth switch valve, and the second throttle branch is provided with a second expansion valve.

7. The heat pump air-conditioning system according to claim 6, wherein the heat pump air-conditioning system is applied to an electric vehicle, and the heat pump air-conditioning system further comprises a plate heat exchanger, wherein the plate heat exchanger is disposed inside the second through-flow branch, and the plate heat exchanger is also disposed inside a motor cooling system of the electric vehicle.

8. The heat pump air-conditioning system according to claim 7, wherein a refrigerant inlet of the plate heat exchanger is in communication with the outlet of the outdoor heat exchanger, and a refrigerant outlet of the plate heat exchanger is in communication with an inlet of the fourth switch valve.

9. The heat pump air-conditioning system according to claim 7, wherein the motor cooling system comprises a motor, a motor heat dissipater, and a water pump that are connected in series to the plate heat exchanger to form a loop.

10. The heat pump air-conditioning system according to claim 1, wherein the heat pump air-conditioning system further comprises a second expansion switch valve, an inlet of the second expansion switch valve is in communication with the outlet of the outdoor heat exchanger, an outlet of the second expansion switch valve is in communication with the inlet of the indoor evaporator, the second throttle branch is a throttle passage of the second expansion switch valve, and the second through-flow branch is a through-flow passage of the second expansion switch valve.

11. The heat pump air-conditioning system according to claim 10, wherein the heat pump air-conditioning system is applied to an electric vehicle, and the heat pump air-conditioning system further comprises a plate heat exchanger, wherein a refrigerant inlet of the plate heat exchanger is in communication with the outlet of the second expansion switch valve, a refrigerant outlet of the plate heat exchanger is in communication with the inlet of the indoor evaporator, and the plate heat exchanger is also disposed inside a motor cooling system of the electric vehicle.

12. The heat pump air-conditioning system according to claim 11, wherein the motor cooling system comprises a coolant trunk, a first coolant branch, and a second coolant branch, a first end of the coolant trunk is selectively in communication with a first end of the first coolant branch or a first end of the second coolant branch, and a second end of the first coolant branch and a second end of the second coolant branch are in communication with a second end of the coolant trunk, wherein a motor, a motor heat dissipater, and a water pump are connected in series to the coolant trunk, and the plate heat exchanger is connected in series to the first coolant branch.

13. The heat pump air-conditioning system according to claim 1, wherein the heat pump air-conditioning system further comprises a gas-liquid separator, the outlet of the indoor evaporator is in communication with an inlet of the gas-liquid separator, and an outlet of the gas-liquid separator is in communication with the inlet of the compressor.

14. The heat pump air-conditioning system according to claim 1, wherein the HVAC assembly further comprises a PTC heater, and the PTC heater is used for heating air flowing through the indoor condenser.

15. The heat pump air-conditioning system according to claim 14, wherein the PTC heater is disposed on a windward side or a leeward side of the indoor condenser.

16. An electric vehicle, comprising the heat pump air-conditioning system according to claim 1.

17. The heat pump air-conditioning system according to claim 8, wherein the motor cooling system comprises a motor, a motor heat dissipater, and a water pump that are connected in series to the plate heat exchanger to form a loop.

* * * * *